United States Patent
Yost

(10) Patent No.: US 8,276,099 B2
(45) Date of Patent: Sep. 25, 2012

(54) SYSTEM OF GUI TEXT CURSOR, CARET, AND SELECTION

(76) Inventor: David Arthur Yost, Los Altos, CA (US)

(*) Notice: Subject to any disclaimer, the term of this patent is extended or adjusted under 35 U.S.C. 154(b) by 598 days.

(21) Appl. No.: 11/576,252

(22) PCT Filed: Sep. 27, 2005

(86) PCT No.: PCT/US2005/034403
§ 371 (c)(1),
(2), (4) Date: Mar. 28, 2007

(87) PCT Pub. No.: WO2006/036887
PCT Pub. Date: Apr. 6, 2006

(65) Prior Publication Data
US 2007/0294644 A1    Dec. 20, 2007

Related U.S. Application Data

(60) Provisional application No. 60/614,211, filed on Sep. 28, 2004.

(51) Int. Cl.
*G06F 3/048* (2006.01)
(52) U.S. Cl. ....................................................... 715/856
(58) Field of Classification Search .......... 715/856–864; 345/145, 157–167
See application file for complete search history.

(56) References Cited

U.S. PATENT DOCUMENTS

| | | | | |
|---|---|---|---|---|
| 5,561,444 A * | 10/1996 | Johnston et al. | ............... | 715/860 |
| 5,613,019 A * | 3/1997 | Altman et al. | ................ | 382/311 |
| 5,798,752 A * | 8/1998 | Buxton et al. | ................ | 715/863 |
| 6,360,237 B1 * | 3/2002 | Schulz et al. | ................ | 715/255 |
| 6,489,981 B1 * | 12/2002 | Jones | ............................. | 715/862 |
| 7,360,157 B1 * | 4/2008 | Yalovsky | ...................... | 715/256 |
| 7,499,913 B2 * | 3/2009 | Kraft et al. | ........................ | 707/3 |
| 2002/0032705 A1 * | 3/2002 | Higashiyama et al. | ....... | 707/530 |
| 2002/0059350 A1 * | 5/2002 | Iwema et al. | ................. | 707/530 |
| 2002/0064308 A1 * | 5/2002 | Altman et al. | ................ | 382/187 |
| 2002/0097270 A1 * | 7/2002 | Keely et al. | .................... | 345/764 |
| 2007/0157085 A1 * | 7/2007 | Peters | ........................... | 715/531 |

* cited by examiner

*Primary Examiner* — Tuyetlien Tran
*Assistant Examiner* — Enrique Iturralde

(57) ABSTRACT

The invention's features improve the user interaction of Caret and Selection manipulation in text GUI components. The Precaret, like the Caret, indicates a position between text characters, but unlike the Caret, the Precaret continually tracks the Cursor, jumping from position to position to indicate exactly where the Caret will be placed when the mouse is clicked. The Gapper visually indicates a gap of one or more white space characters in the text or a gap of white space between paragraphs; the Gapper tracks either the Precaret or the Caret, whichever moved last. An enhanced Cursor switches to a less-obtrusive form while it is over text so as not to obscure the position of the Precaret while moving the mouse or the leading edge of the Selection while dragging the mouse. The Caret and Precaret change shape to indicate a special feature of a position within the text, such as the wrapping of one text row to the next.

10 Claims, 44 Drawing Sheets

Where will the Caret go?
Answer: to the 's' because that's where the Precaret is.

```
0         10                  25
Here is a character range in a model.|modelLength (37)
         start            end         modelLength – 1 (36)
```

Fig. 1. The Model

I

Fig. 2. A traditional text Cursor

The highlight for selected characters is a background color.

Fig. 3. A selection

Traditional caret: | a black vertical line

Fig. 4. The Caret

Old way: Office upon

New way: Once upon

Fig. 5. Will the Caret go to the
'n' at left or to the 'c' at right?
Answer: to the 'c' because that's where the Precaret is.

Old way:
New way:
Fig. 6. Will the Caret go to the row above or the row below?
Answer: Above because that's where the Precaret is.

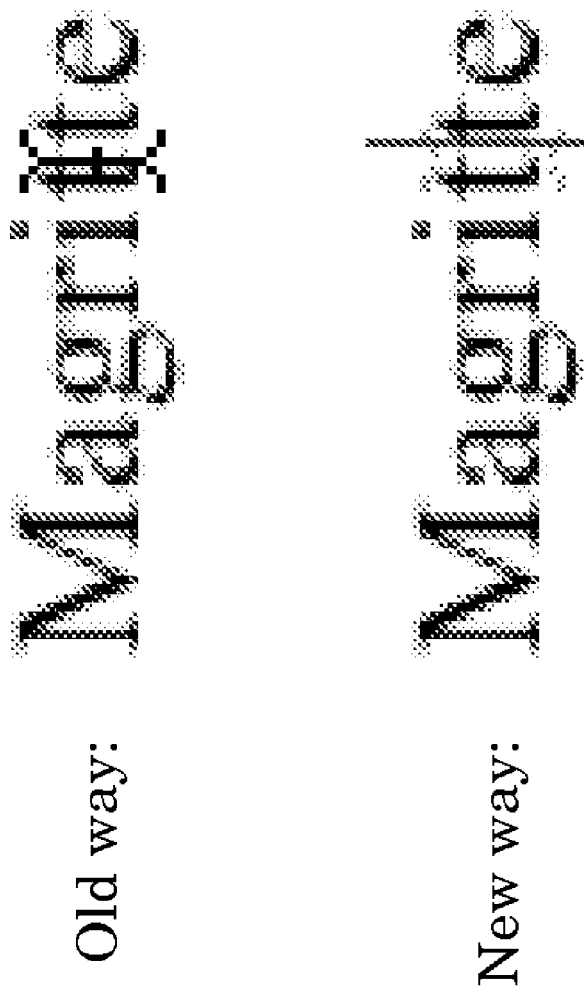
Fig. 7. The traditional Cursor obscures what is behind it. The new cursor does not.

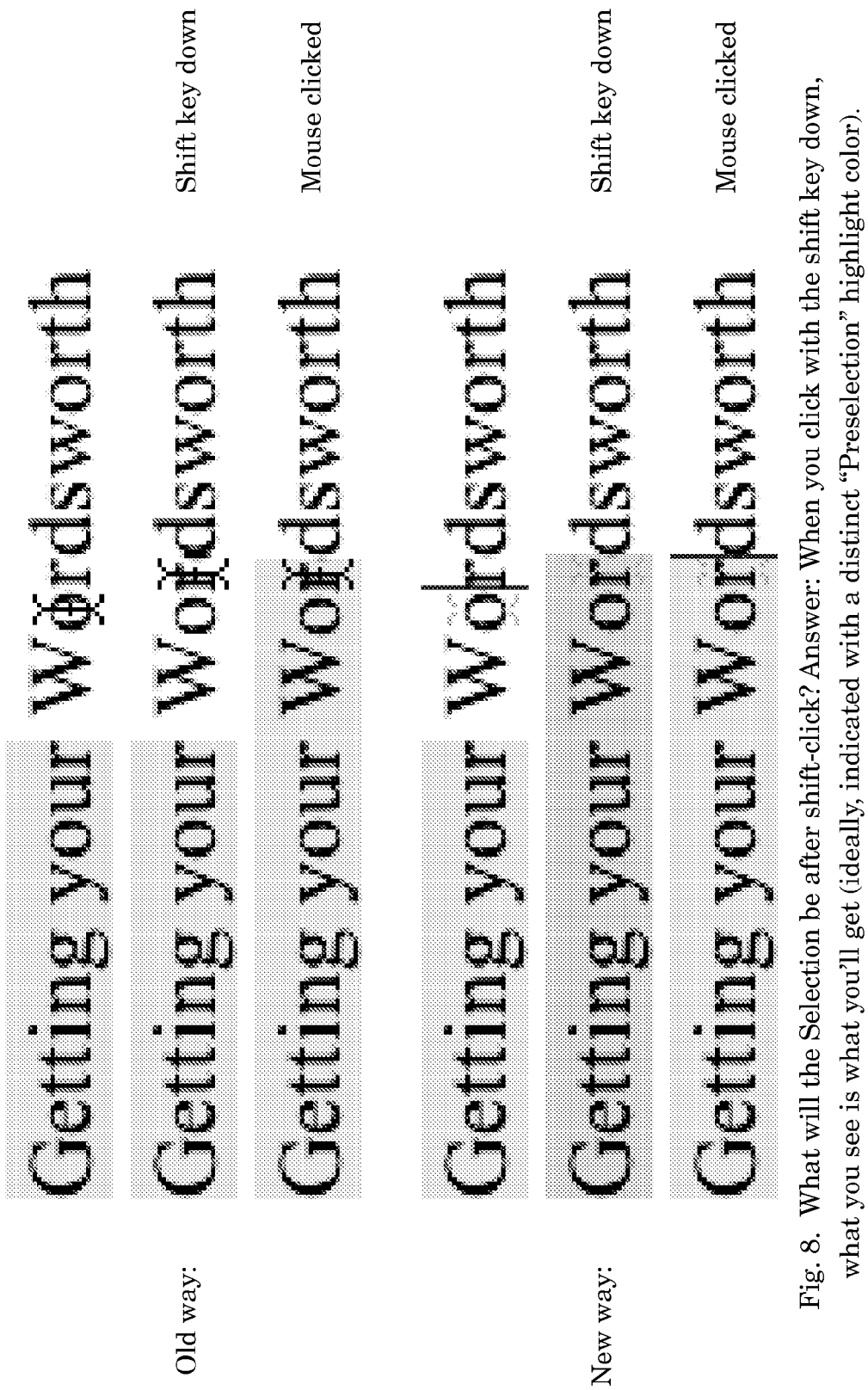
Fig. 8. What will the Selection be after shift-click? Answer: When you click with the shift key down, what you see is what you'll get (ideally, indicated with a distinct "Preselection" highlight color).

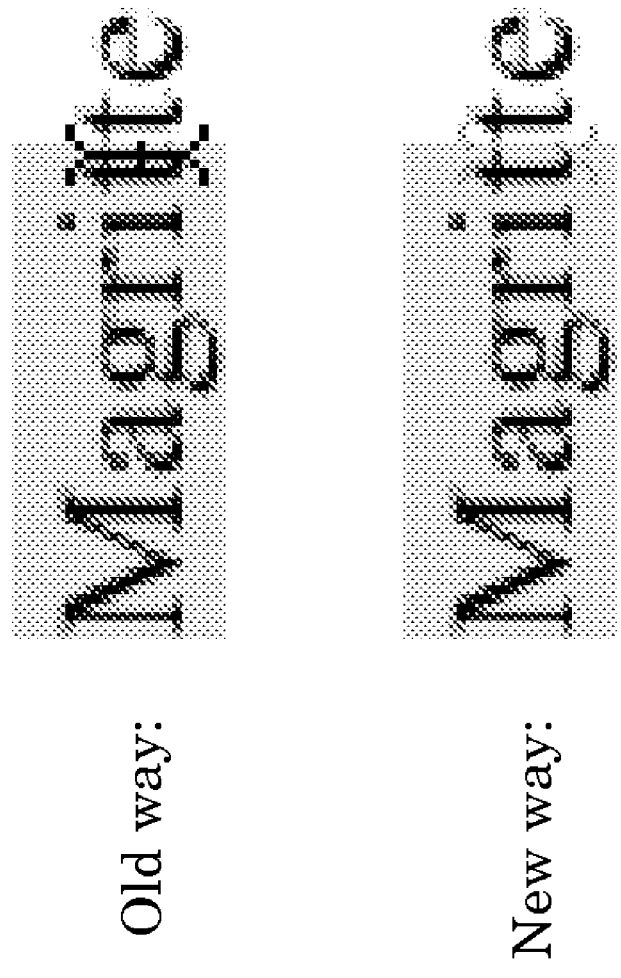
Fig. 9. The traditional Cursor gets in the way while selecting. The Dimmed Cursor graphic is less obtrusive.

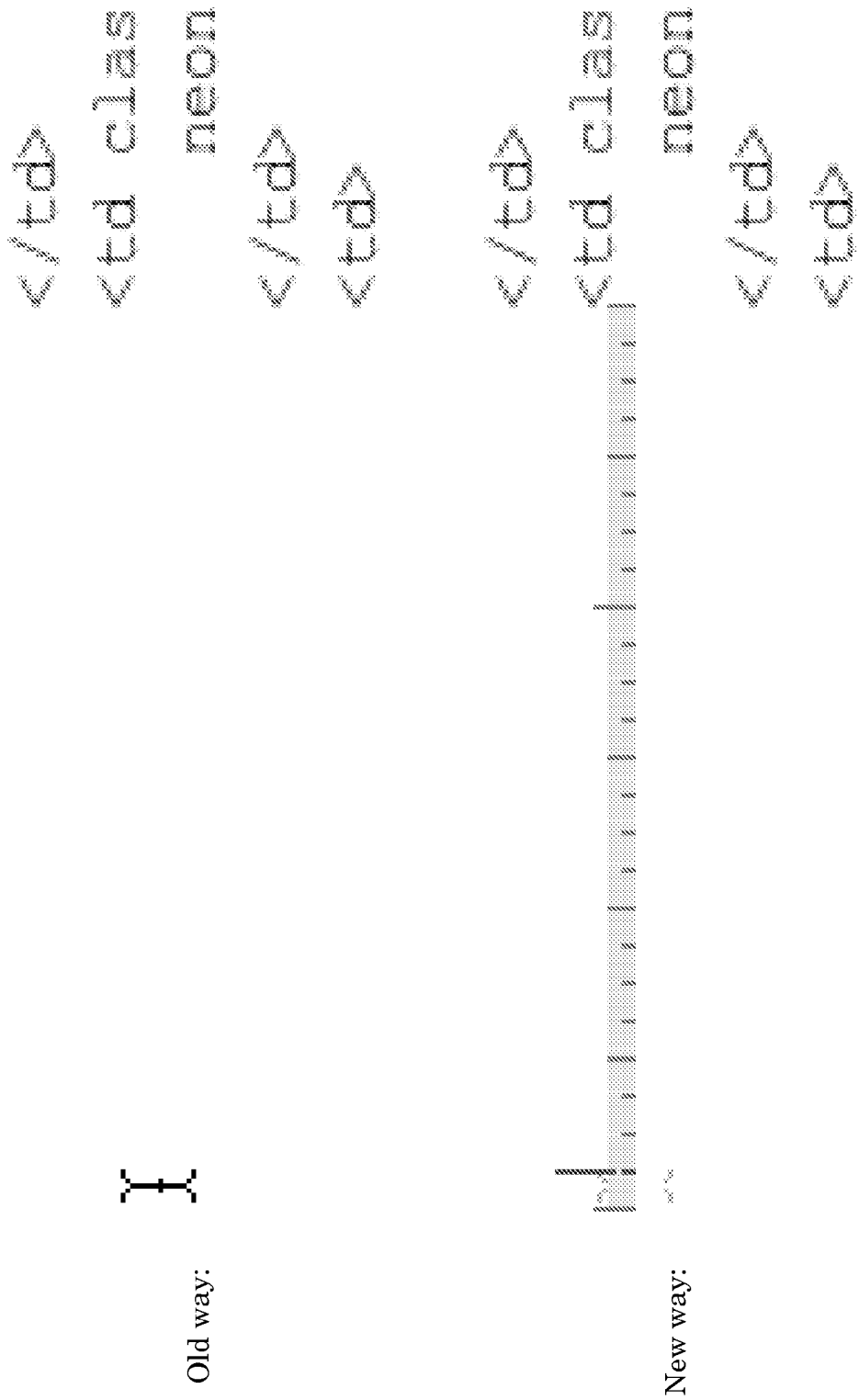
Fig. 10. When lines that start with a lot of whitespace, which line are you on? The illuminated space gap provides orientation.

Old way: First I second

New way: First second

Fig. 11. Where will the Caret go?
Answer: to the 's' because that's where the Precaret is.

Old way: TYPOGRAPHY

New way: TYPOGRAPHY

Fig. 12. Is there an unwanted space character here in this letter-spaced word?
Answer: Yes; one; the Gapper shows it clearly.

Fig. 13. Is there one space character there or two? Answer: One.
Fig. 14. Is there one space character there or two?
Answer: One; it looks like more only because the paragraph is right-justified.

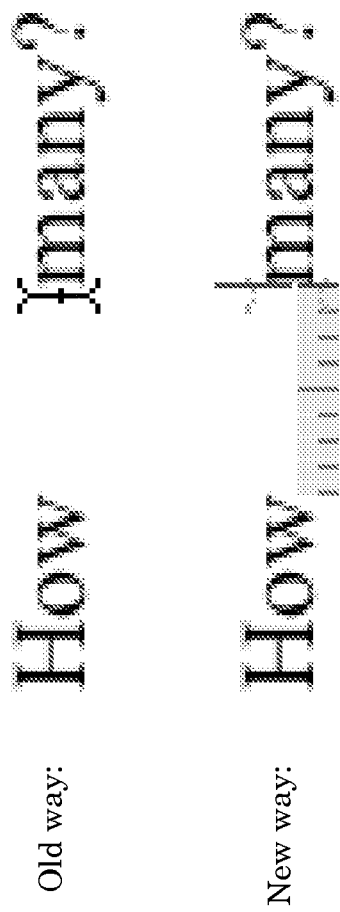
Fig. 15. How many space characters are there?
Answer: easy to see there are 8.
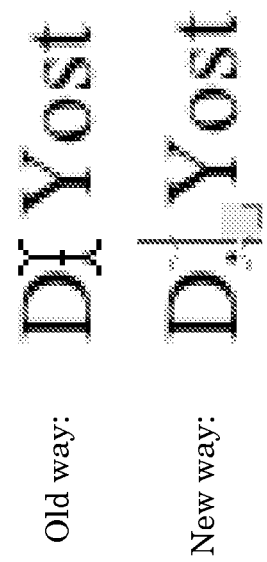
Fig. 16. What kind of space is that?
Answer: a no-break space,
as indicated by the reverse 'L' mark.

Old way: Mind the gap.

New way: Mind the gap.

Fig. 17. Is that blank area the left margin of the text area, or is there a Whitespace Gap there?
Answer: It's a Whitespace Gap, as indicated by the Precaret and the Gapper.

Old way:
For myself, I found
as for the study of t

New way:
For myself, I found
as for the study of t

Fig. 18. Are there Whitespace Characters to the left, or is this a paragraph indent?
Answer: It's an indent because otherwise Whitespace Characters would be indicated.

Old way: Out with the old way.

New way: Out with the old way.

Fig. 19. Are there Whitespace Characters at the end of the row?
Answer: Yes, two of them, as indicated by the Gapper.

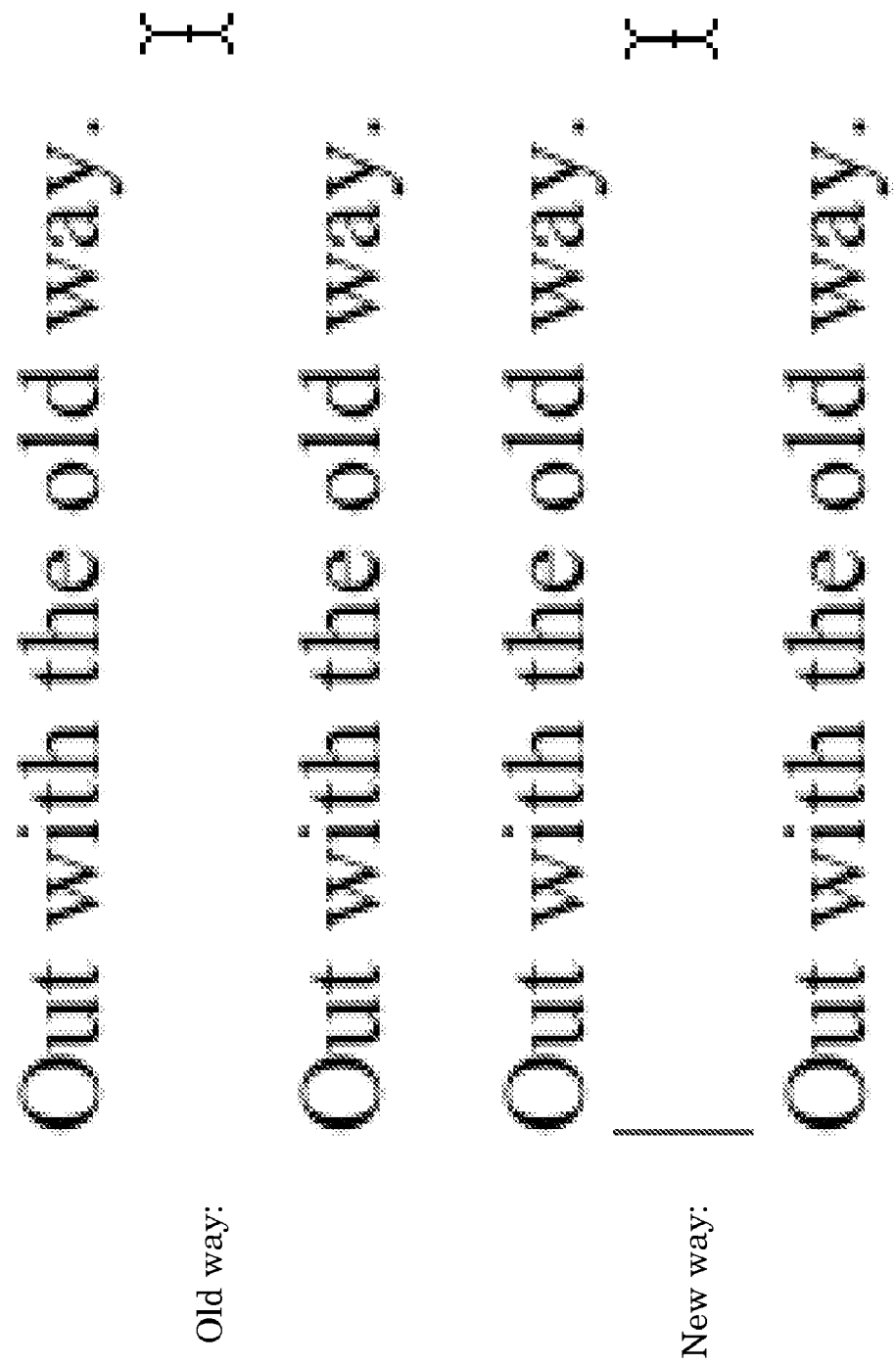
Fig. 20. Is there a blank line there or is it a Vertical Gap?
Answer: It's a blank line; as indicated by the Precaret at the beginning of the row.

Old way:

Below this line is a paragraph gap.

Out with the old way.

New way:

Below this line is a paragraph gap.

Out with the old way.

Fig. 21. Is there a blank line there or is it a Vertical Gap?
Answer: It's a Vertical Gap, as indicated by the Gapper.

Old way:

; every kind of Imposture.
had a kind of familiarity

New way:

; every kind of Imposture.↵
had a kind of familiarity

Fig. 22. Is the end of this line the end of the paragraph, is it a Soft Return, or does it wrap to the next row? Answer: It wraps. (Note the arrow at the bottom of the Precaret.)

Old way:

what is old, and that
So I thought my Na

New way:

what is old, and that
↤So I thought my Na

Fig. 23. Is this the start of a paragraph, or did the previous row wrap to here?
Answer: The previous row wrapped. (Note the arrow at the top of the Precaret.)

Old way:

my Nature had a kind of
with Truth. ⊢⊣
the Interpretation of Nature"?

New way:

my Nature had a kind of
with Truth. ⌐⌐
the Interpretation of Nature"?

Fig. 24. Is that the end of the paragraph, or is it a Soft Return?
Answer: a Soft Return, as shown by the Soft Return Caret Graphic.

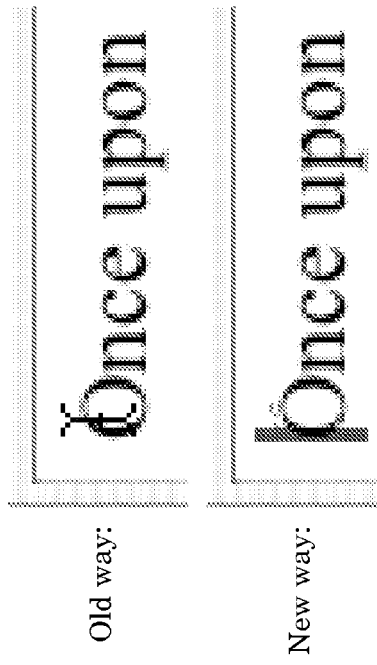
Fig. 25. Is this the start of the text?
Answer: Yes because the Precaret is thick.
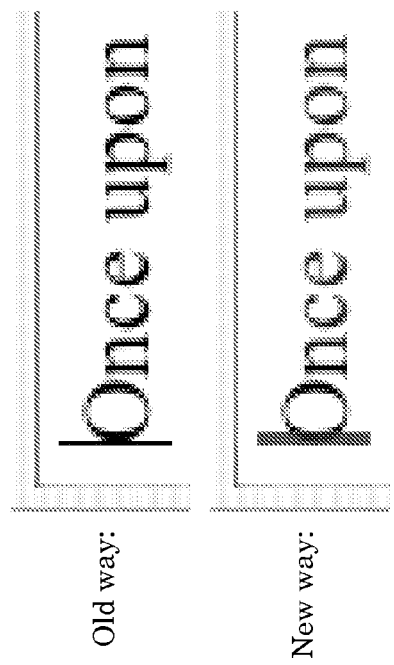
Fig. 26. Is this the start of the text?
Answer: Yes because the Caret is thick.

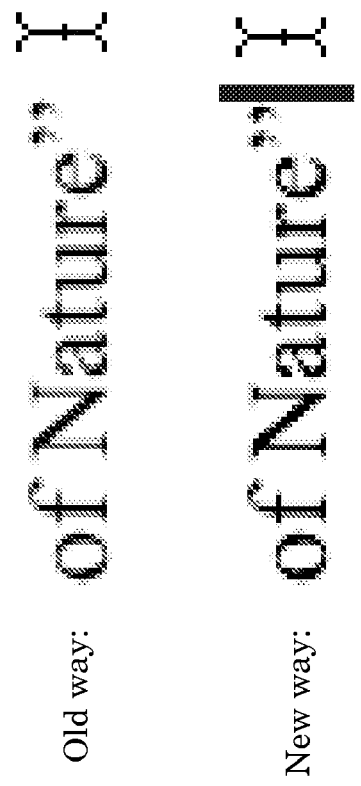
Fig. 27. Is this the end of the text?
Answer: Yes because the Precaret is thick.
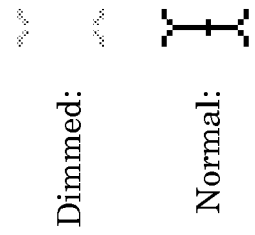
Fig. 28. Dimmed Cursor Graphic and Normal Cursor Graphic

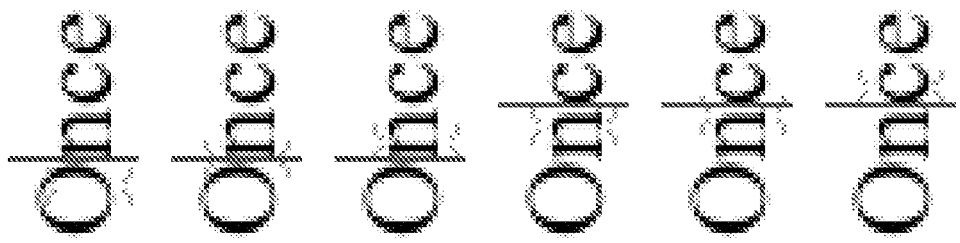
Fig. 29. Time-series shows how the Precaret (vertical line) jumps from position to position as the Dimmed Cursor moves.

Fig. 30. The Cursor and Precaret inside a Selection.
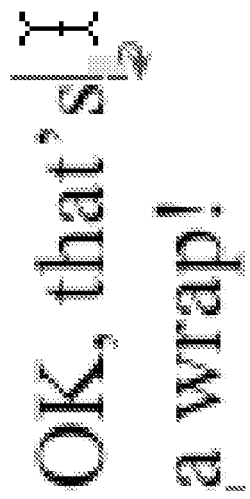
Fig. 31. The Precaret, at the end of a row that wraps to the next row.
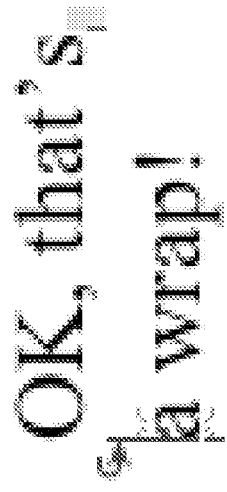
Fig. 32. The Precaret, at the start of a row that wrapped from the previous row.

Fig. 33. The Soft Return Caret Appearance, at the position of a Soft Return (which breaks the row without ending the paragraph).

Fig. 34. The Start-End Caret Appearance, at the start of the Model.

Fig. 35. The Start-End Caret Appearance, at the end of the Model.

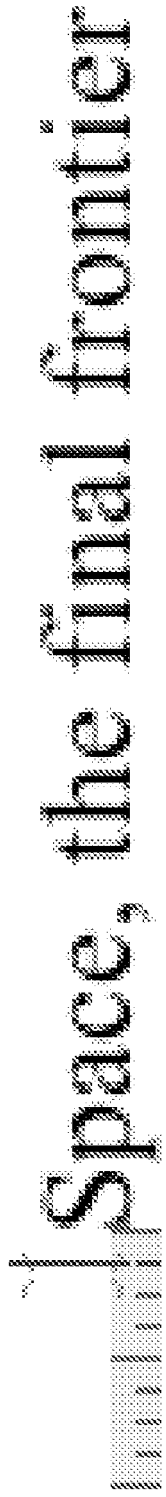
Fig. 36. The Gapper, illuminating 8 space characters at the start of a row. The Precaret is one position to the left of the 'S'.
Fig. 37. The Gapper with the Option/Alt key down, illuminating all space gaps in the row.

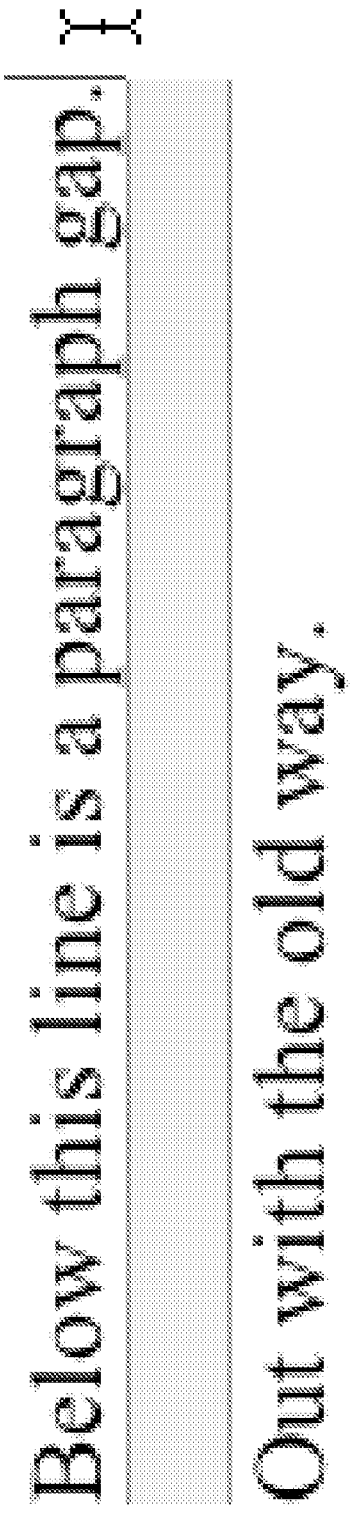
Fig. 38. The Paragraph Gapper, illuminating a Vertical Gap between two paragraphs.
Fig. 39. Space Marks, showing
4 Minor, 1 Major, 3 Minor, 1 Major, then 2 Minor Space Marks,
the last of which marks the end of the Whitespace Gap.

Fig. 40. Space Marks, showing 1 Major, 3 Minor, 1 Major, 3 Minor Space Marks, etc. with a Super Mark atop the first and fifth Major Space Marks.
Fig. 41. The Gapper, showing a tab, 7 spaces, another tab, and another 4 spaces.
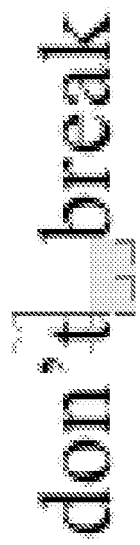
Fig. 42. The Gapper, showing a Whitespace Gap containing two No-Break-Space Marks. The Precaret is at the start of the View Whitespace Gap.

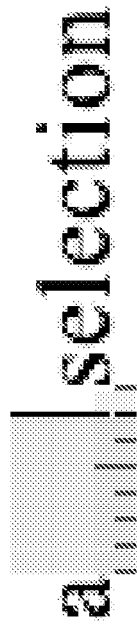
Fig. 43. The Gapper, illuminating a gap inside a Selection. The gapper and the Precaret are shown with the same color. (Cursor is absent because arrow keys were used to navigate here.)
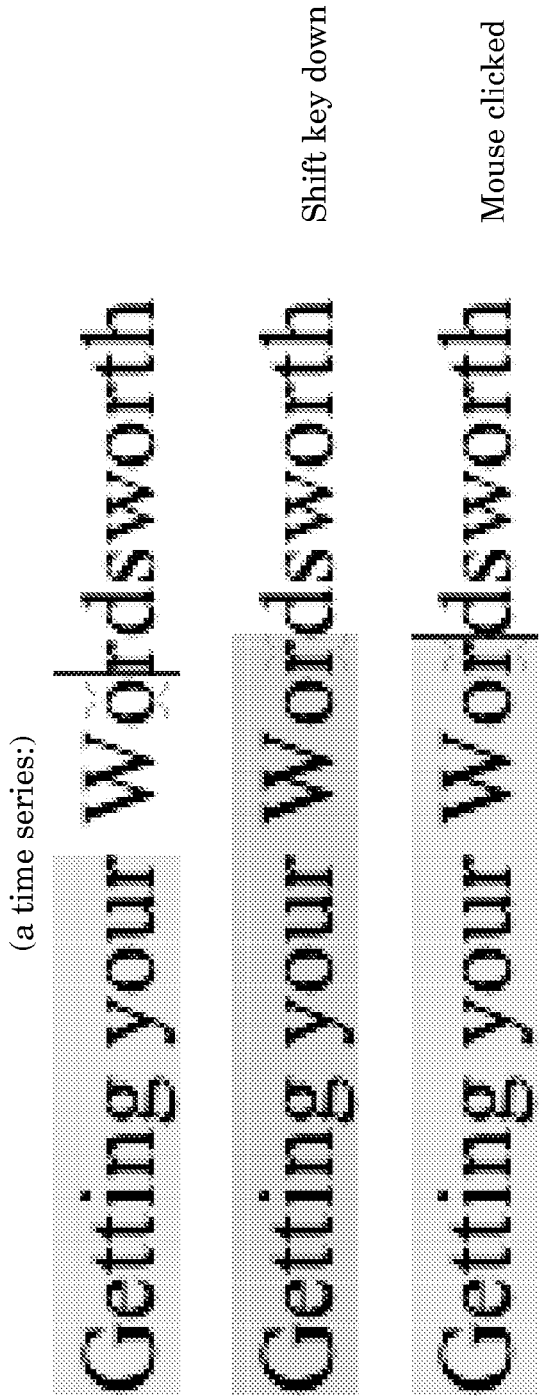
Fig. 44. The Preselection, seen only when the shift key is down and the Mouse is moving (middle screen shot in the time series).

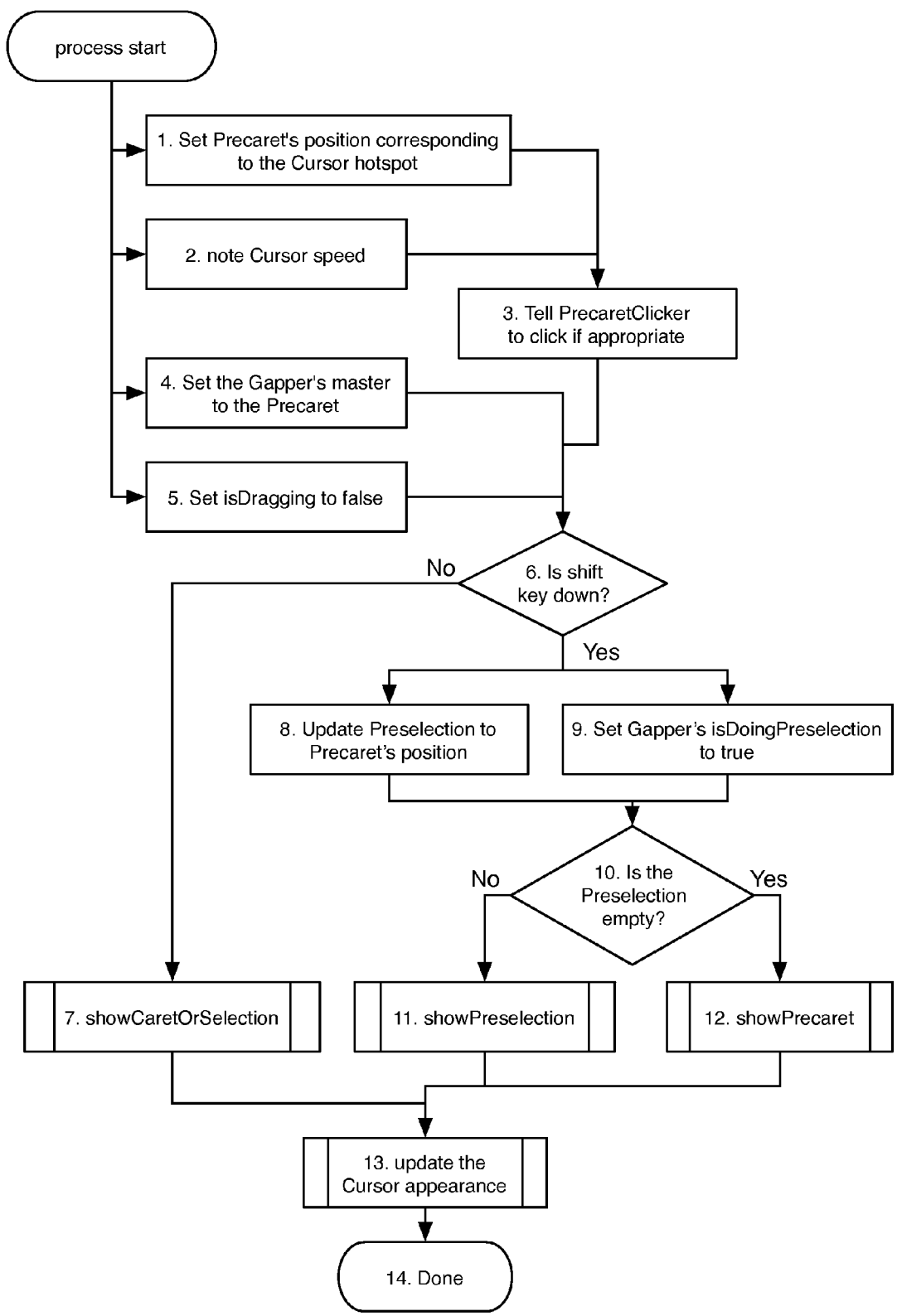
Fig. 45. The mouseMoved process

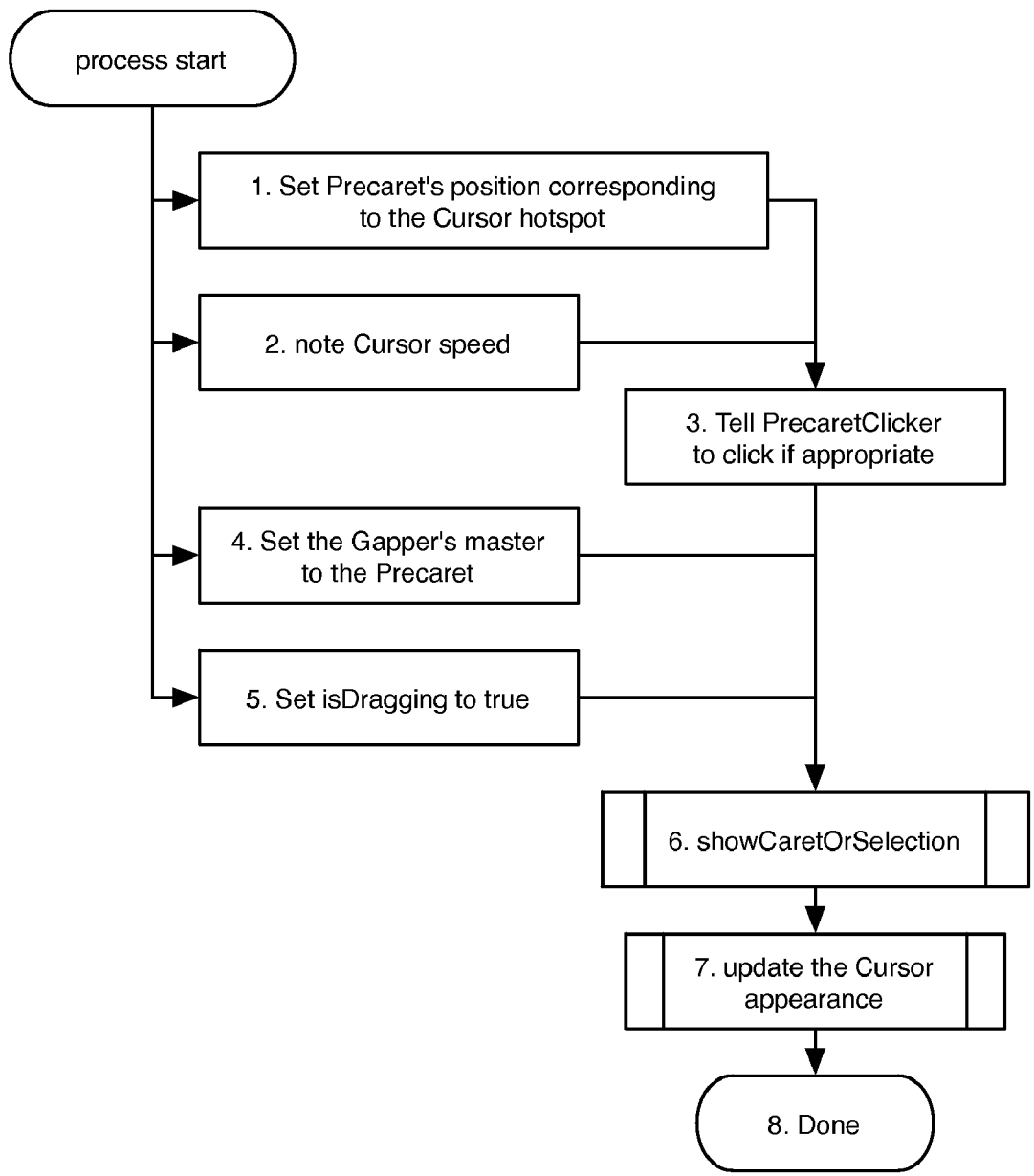
Fig. 46. The mouseDragged process

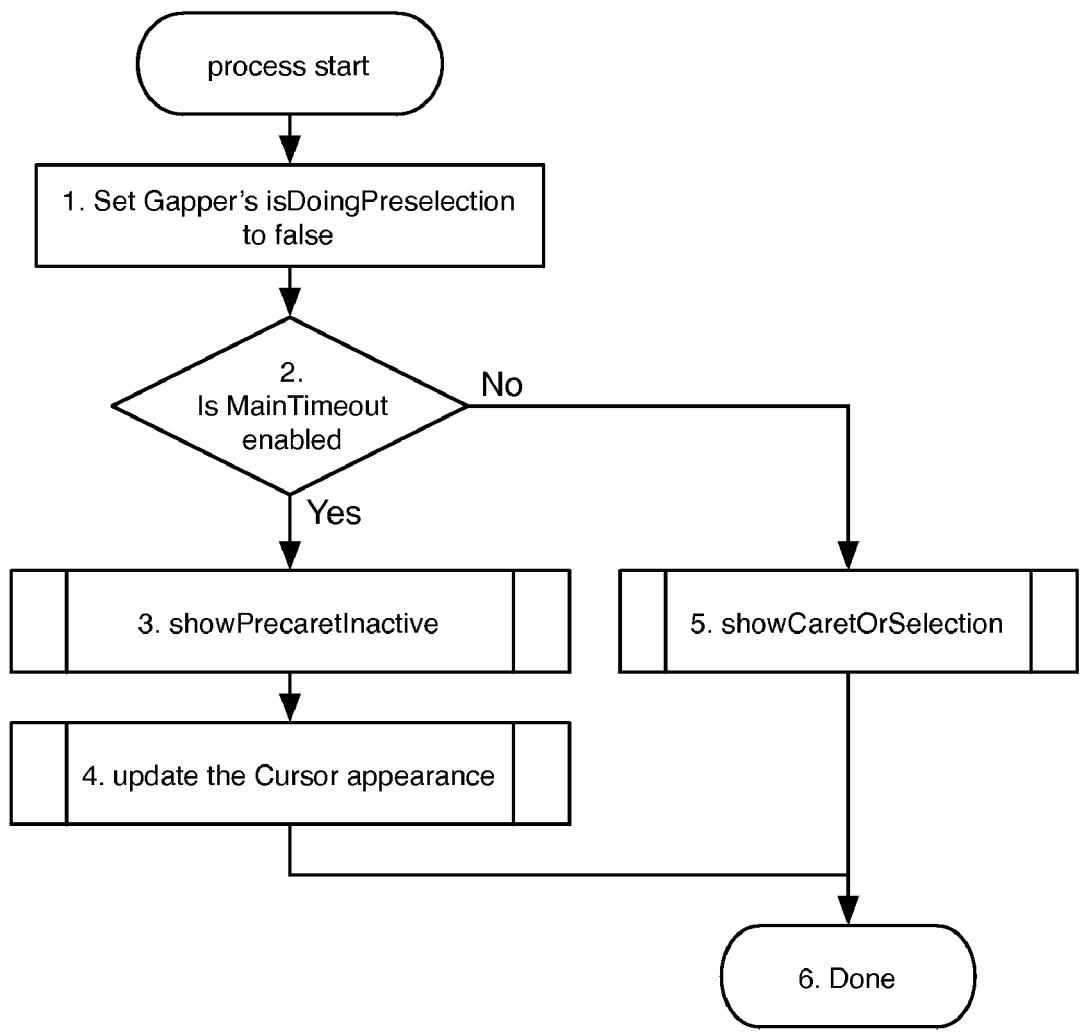
Fig. 47. The mouseClicked process

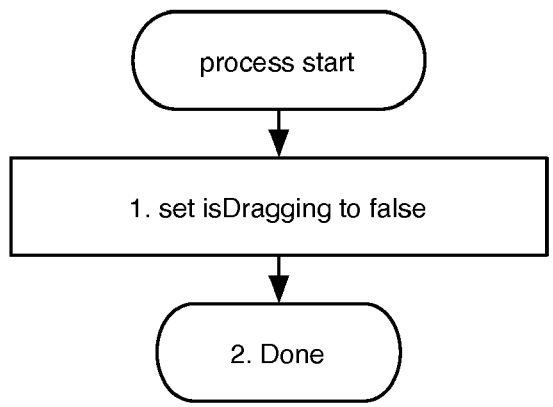
Fig. 48. The mouseReleased process
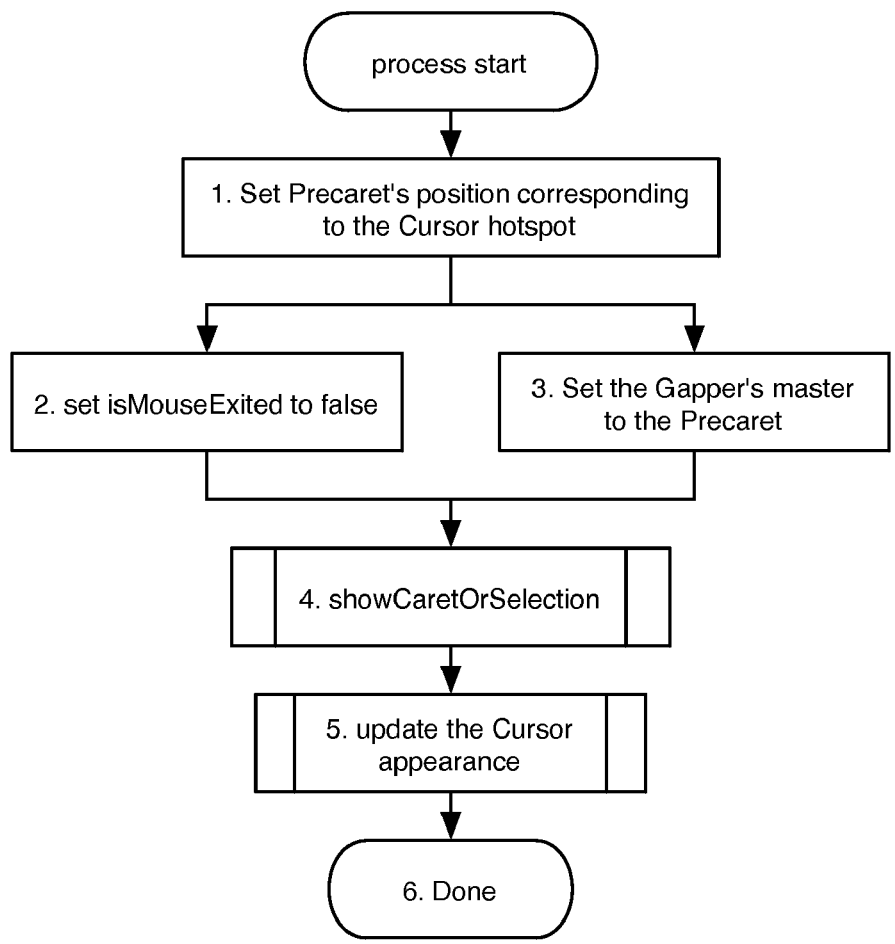
Fig. 49. The mouseEntered process

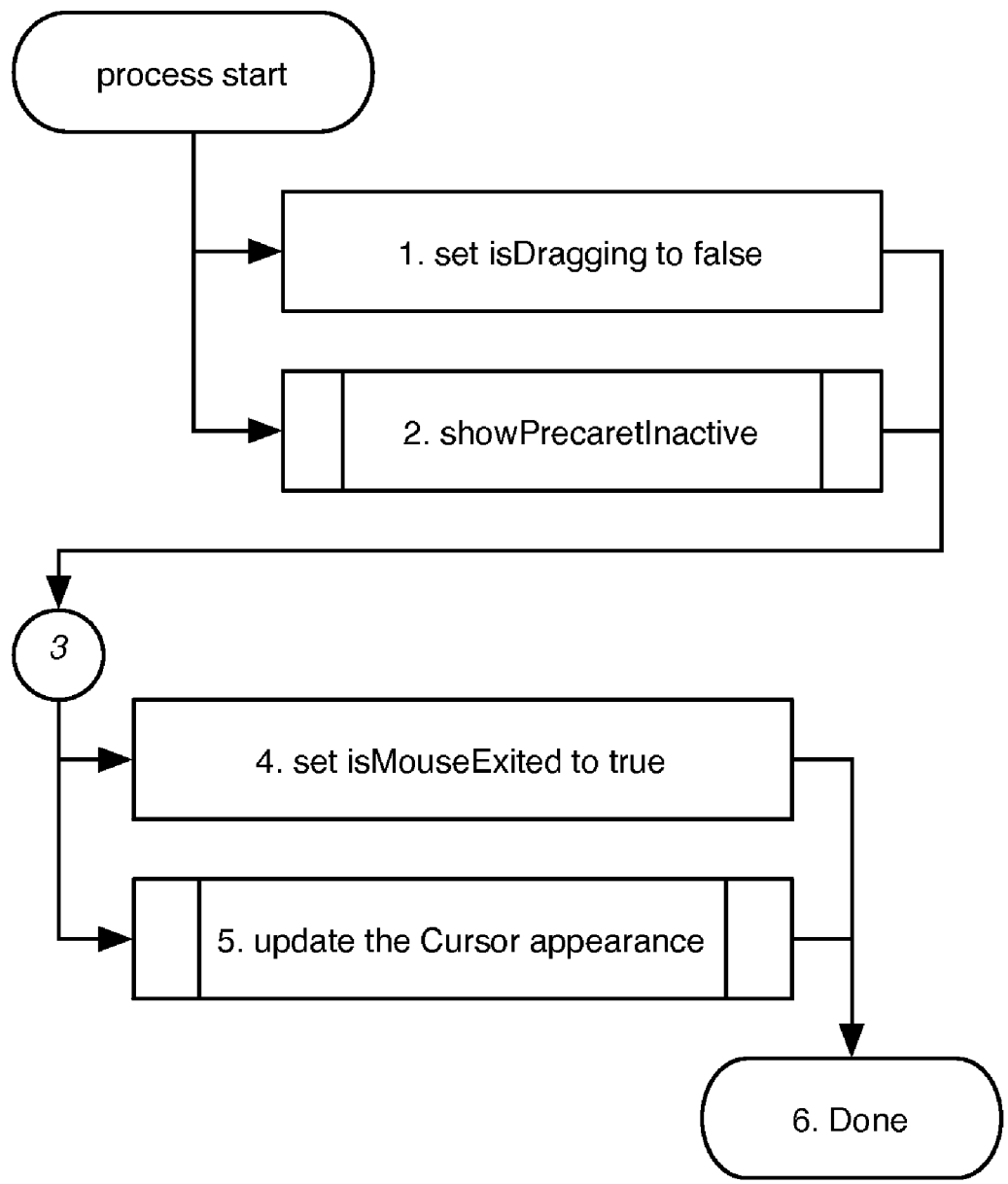
Fig. 50. The mouseExited process

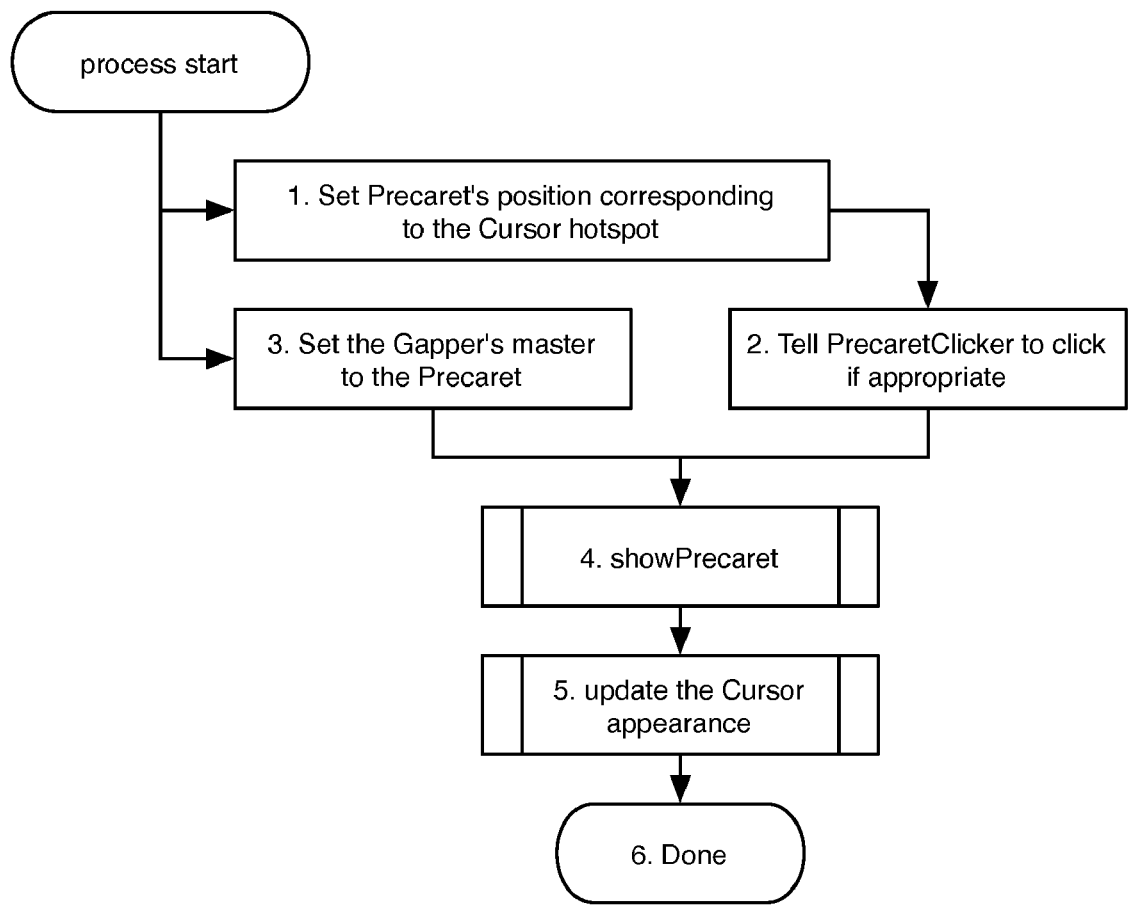
Fig. 51. The dragOver process

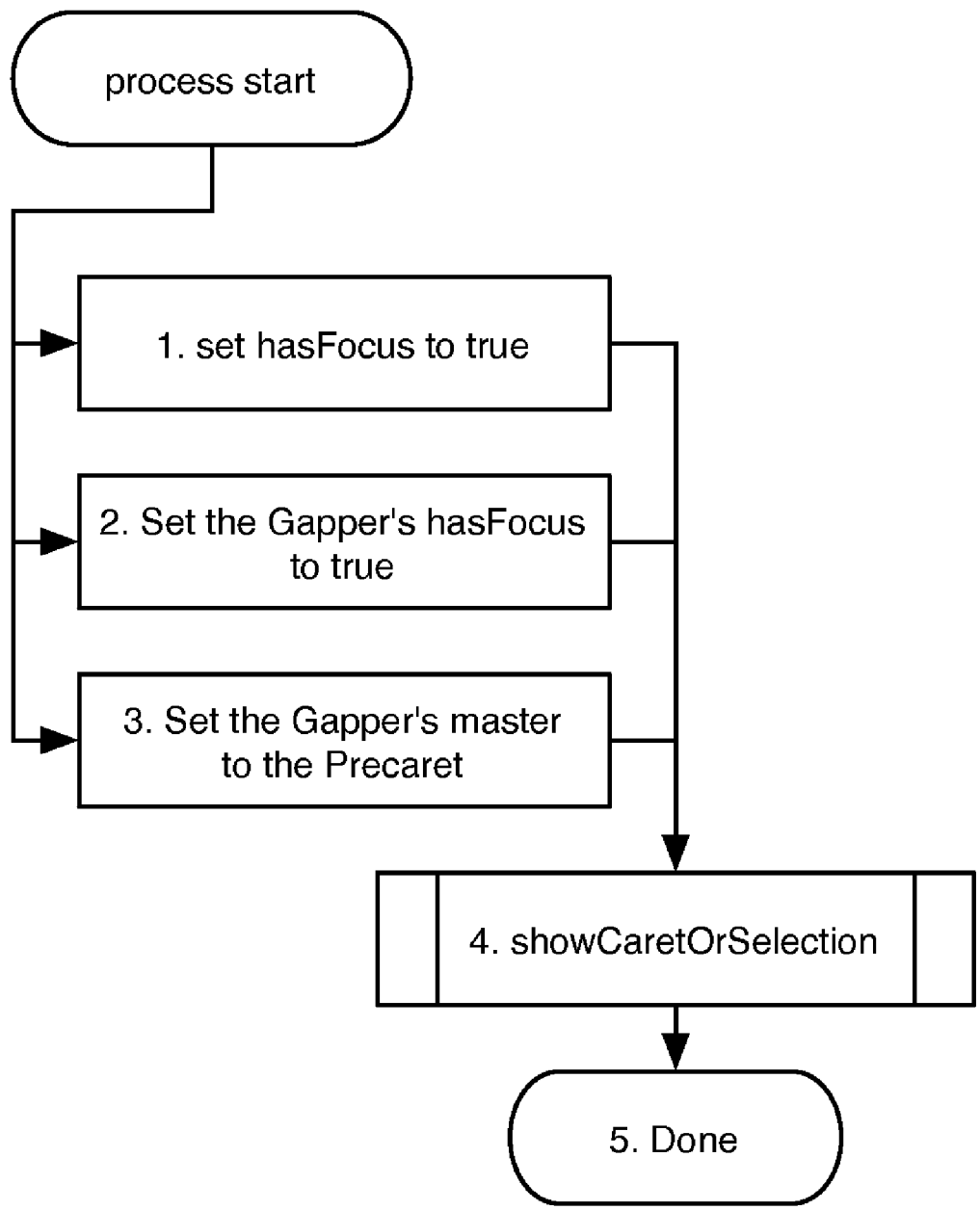
Fig. 52. The focusGained process

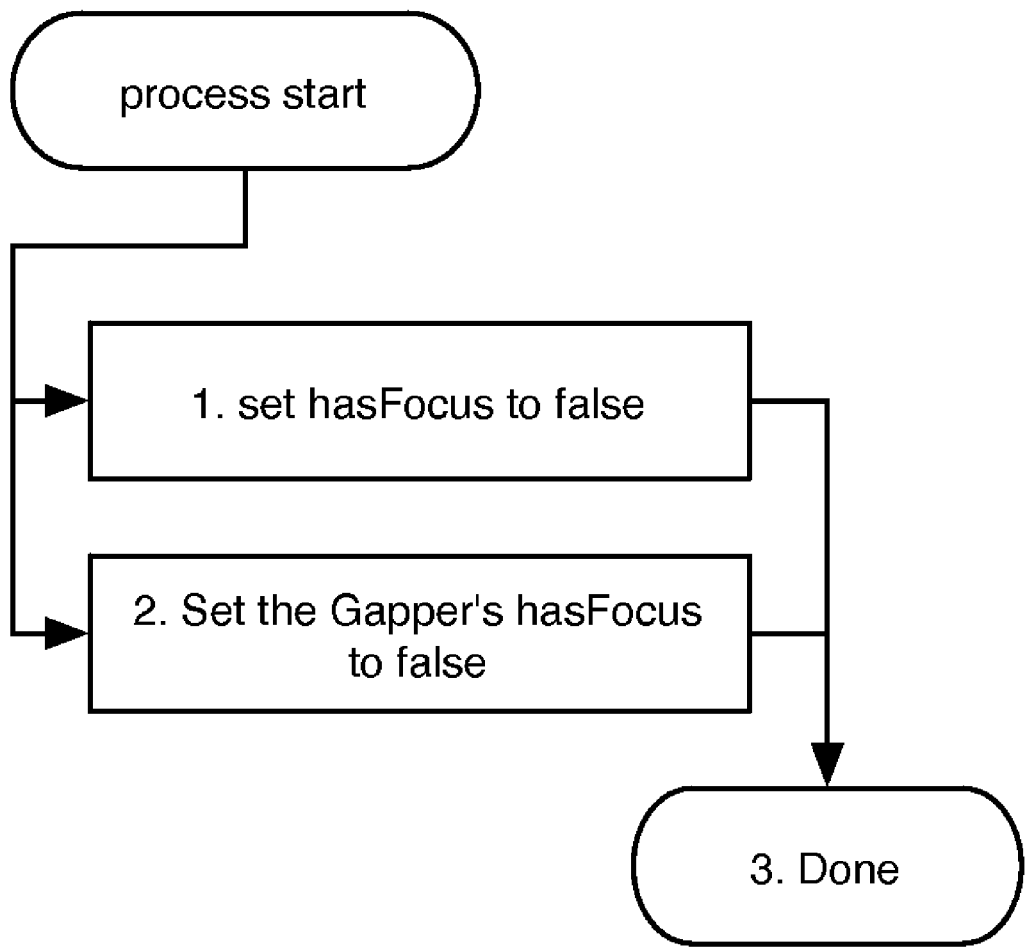
Fig. 53. The focusLost process

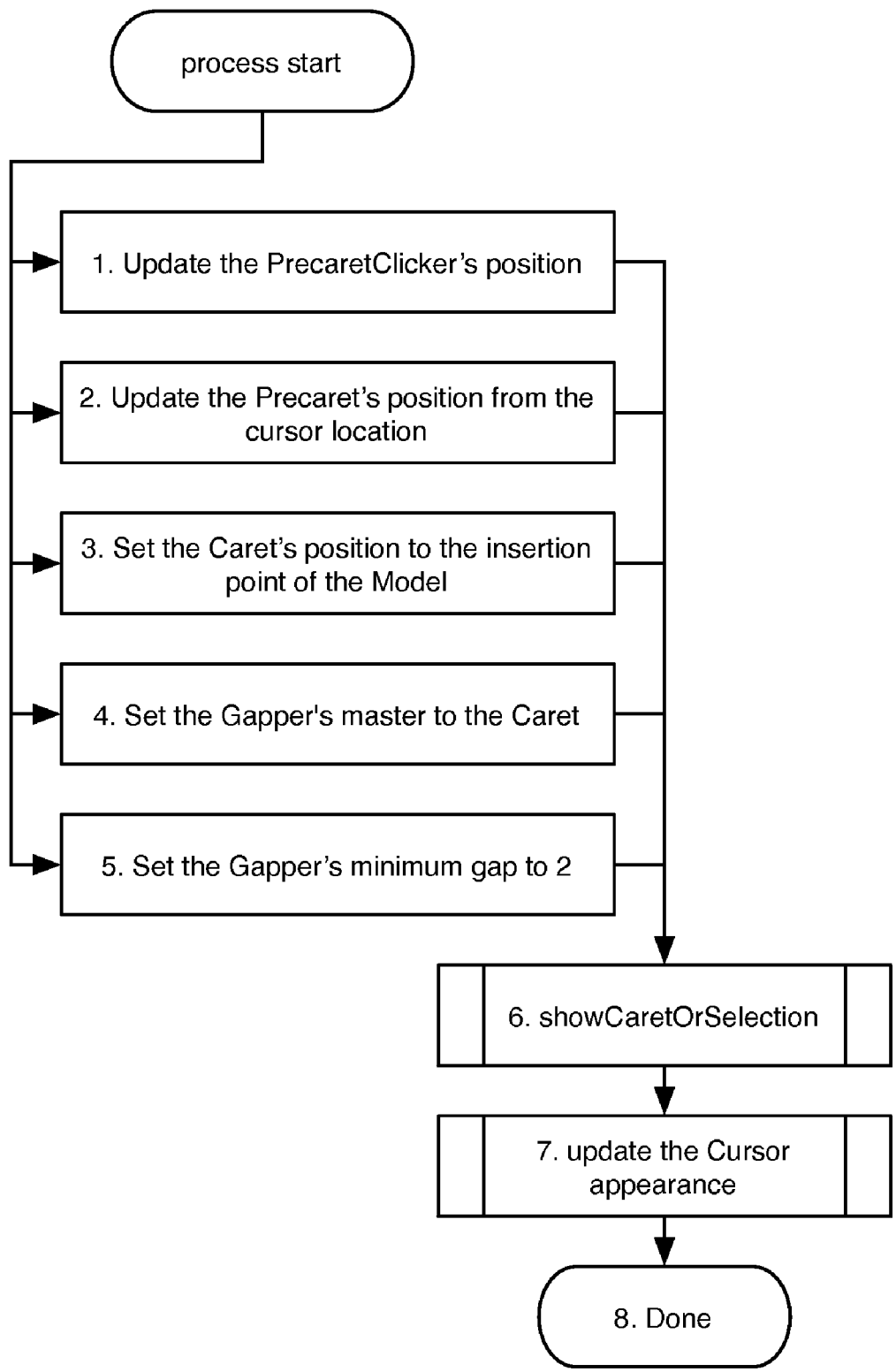
Fig. 54. The modelInsertionOccurred process

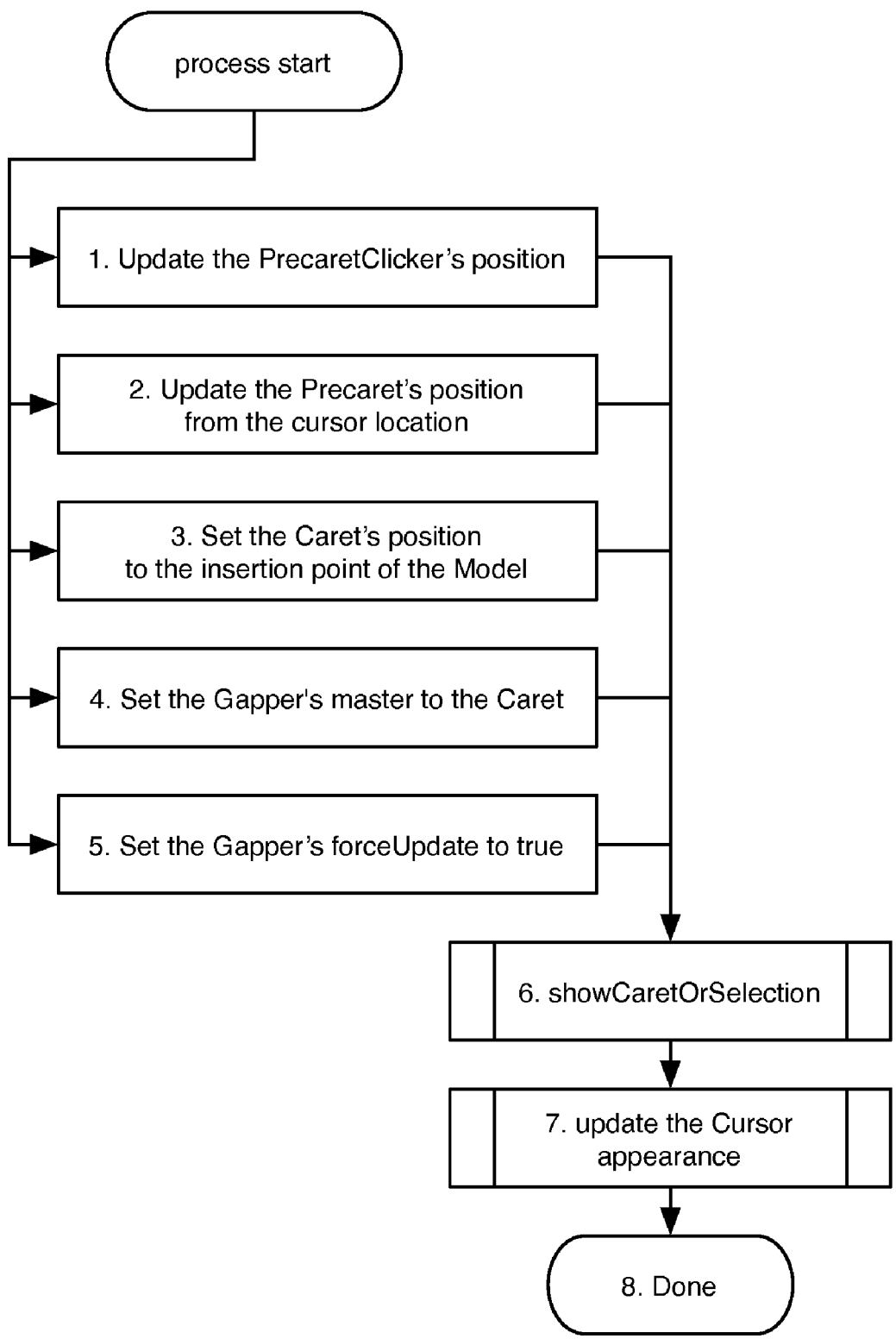
Fig. 55. The modelDeletionOccurred process

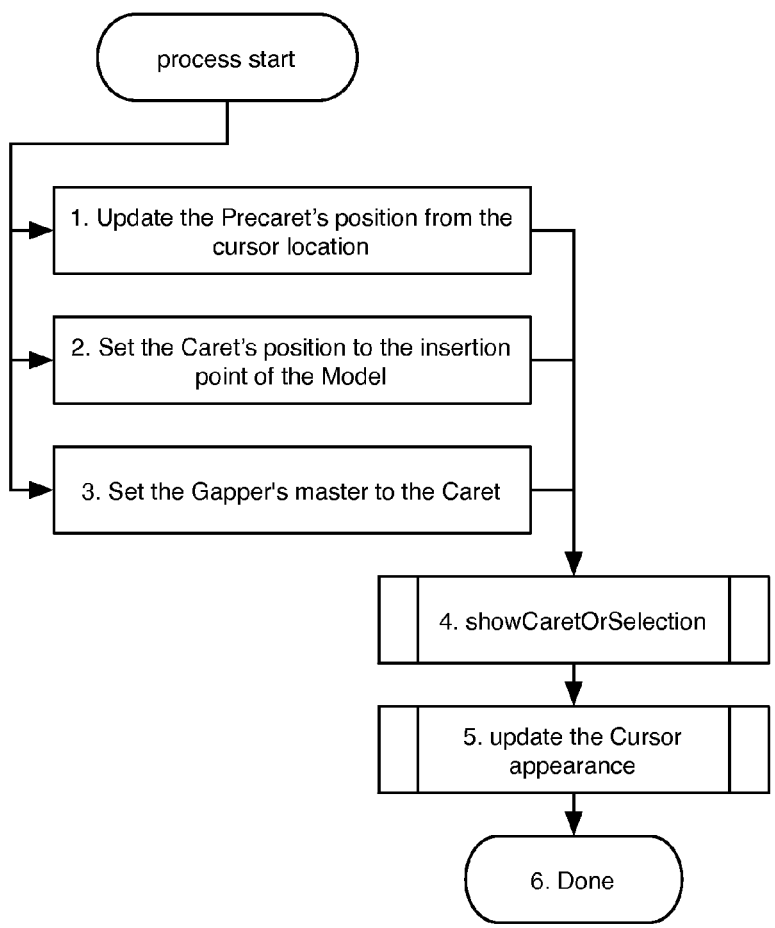
Fig. 56. The caretUpdated process
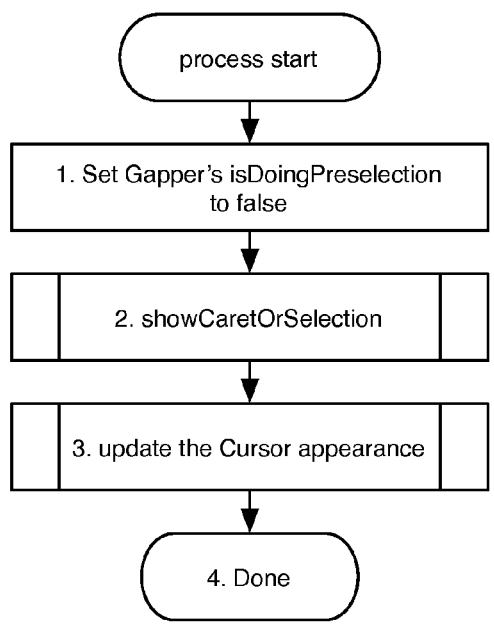
Fig. 57. The shiftKeyReleased process

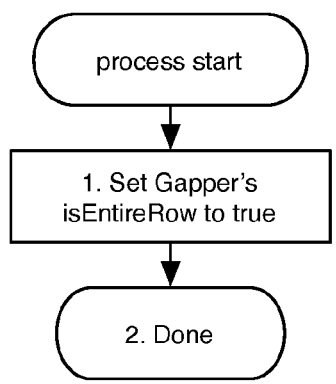
Fig. 58. The optionKeyPressed process
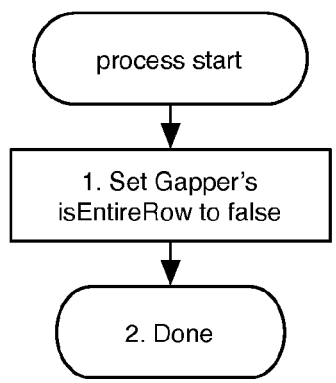
Fig. 59. The optionKeyReleased process
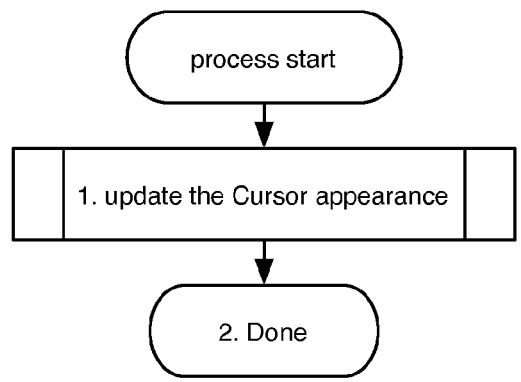
Fig. 60. The mouseStopped process

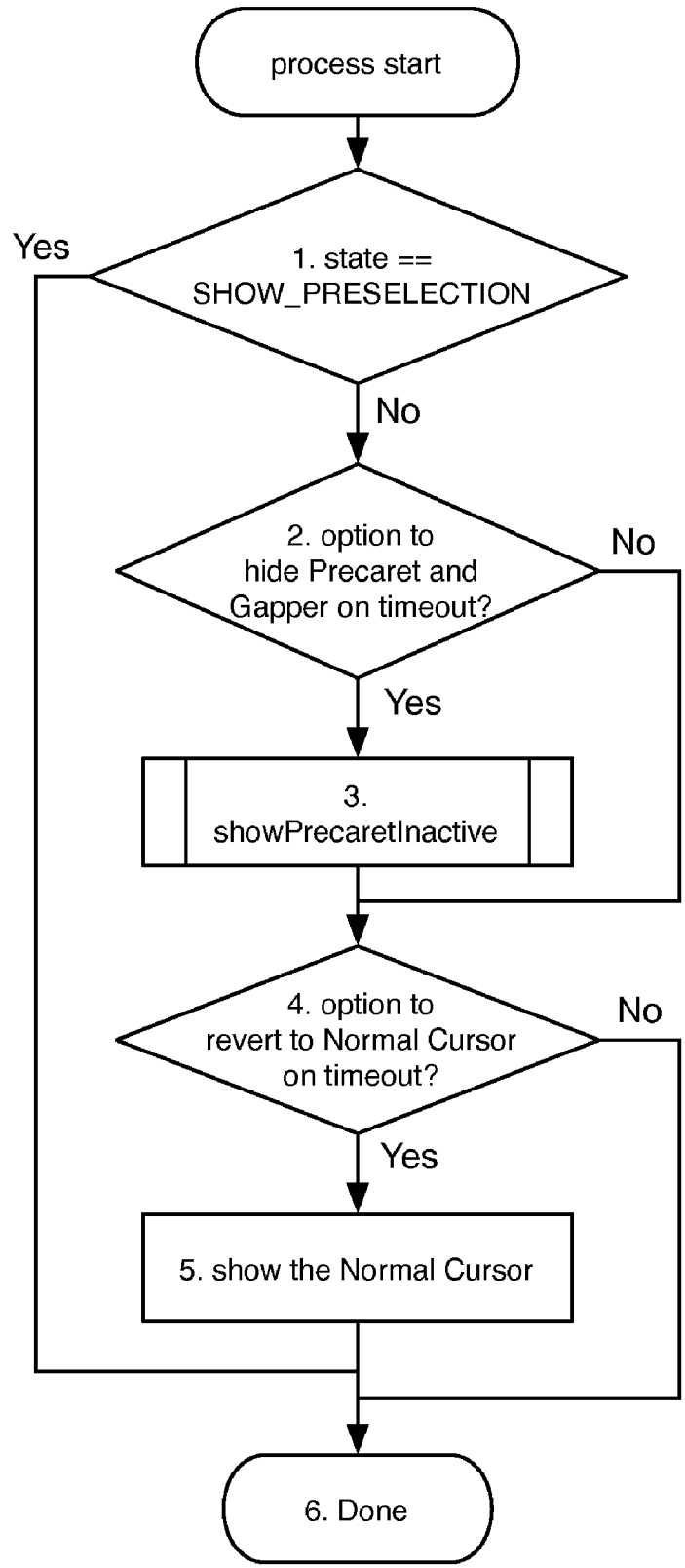
Fig. 61. The mainTimeoutExpired process

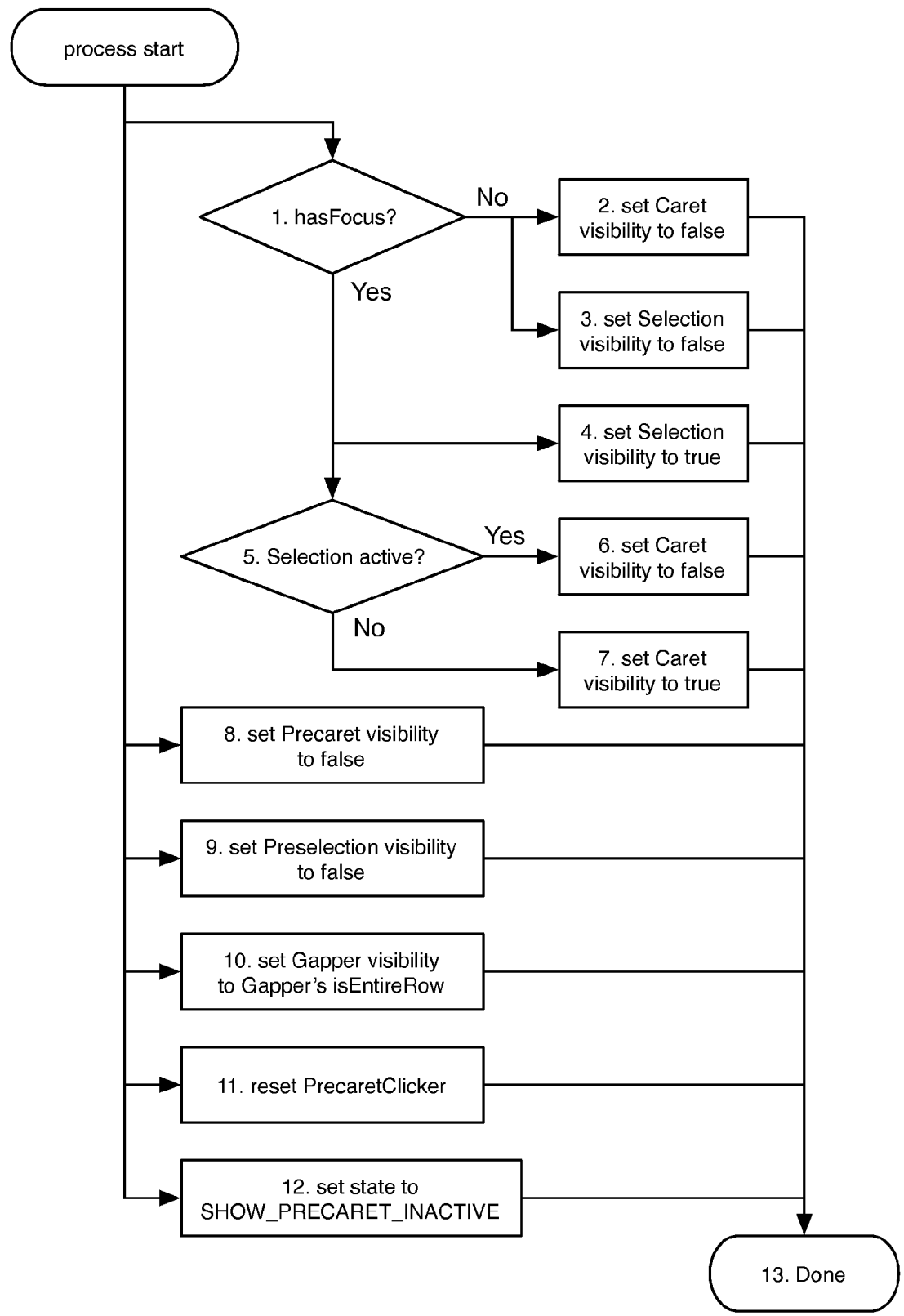
Fig. 62. The showPrecaretInactive process

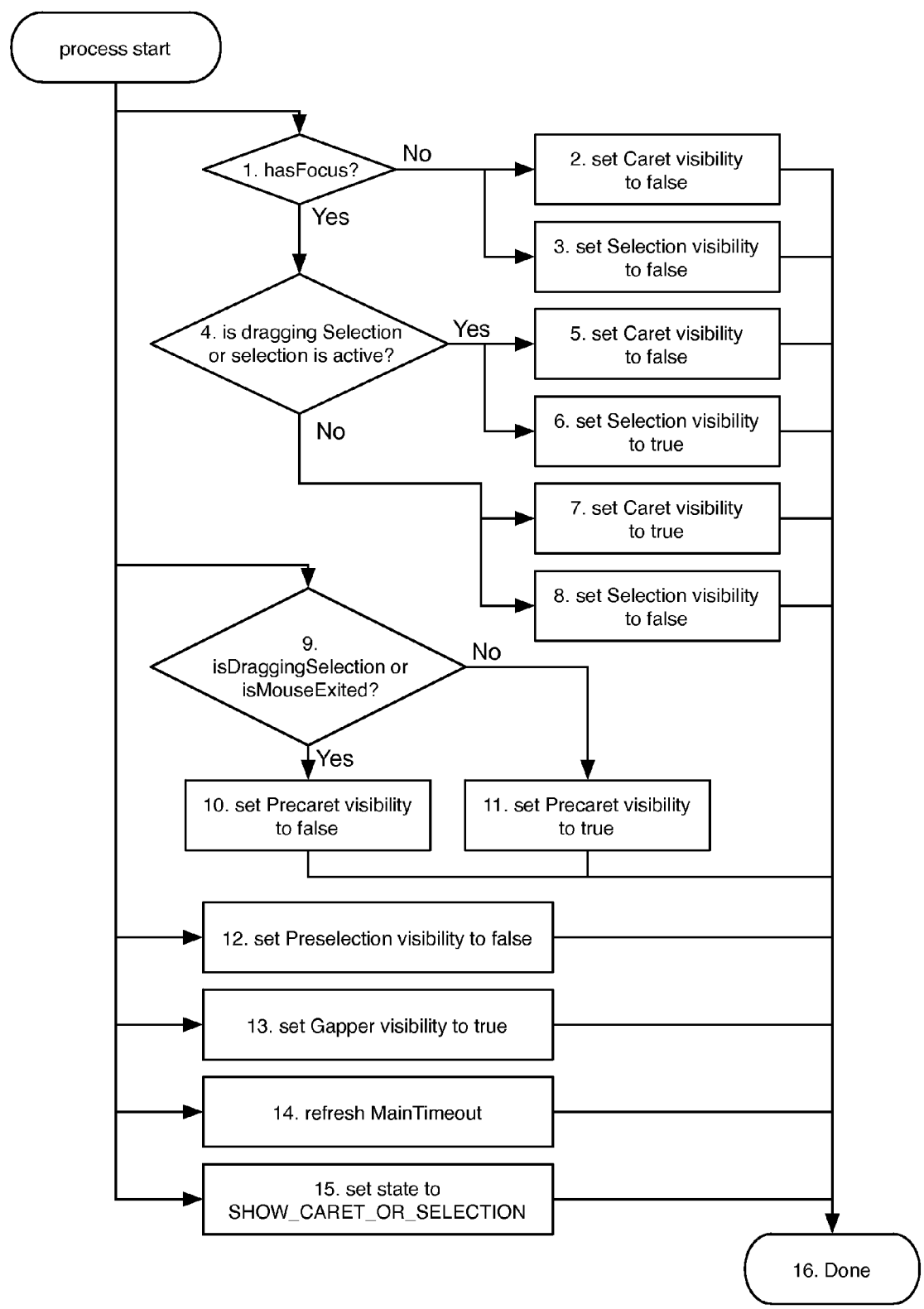
Fig. 63. The showCaretOrSelection process

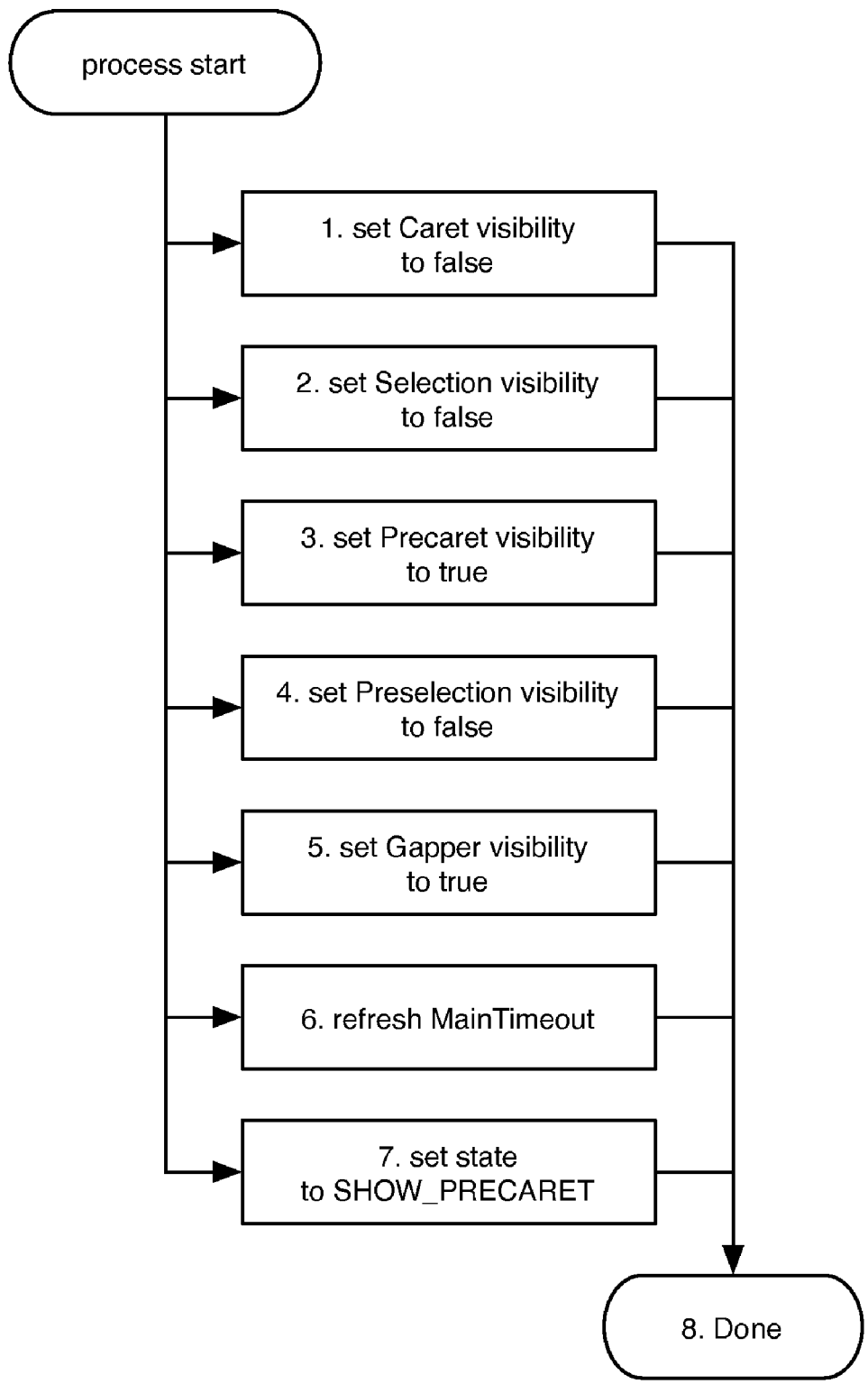
Fig. 64. The showPrecaret process

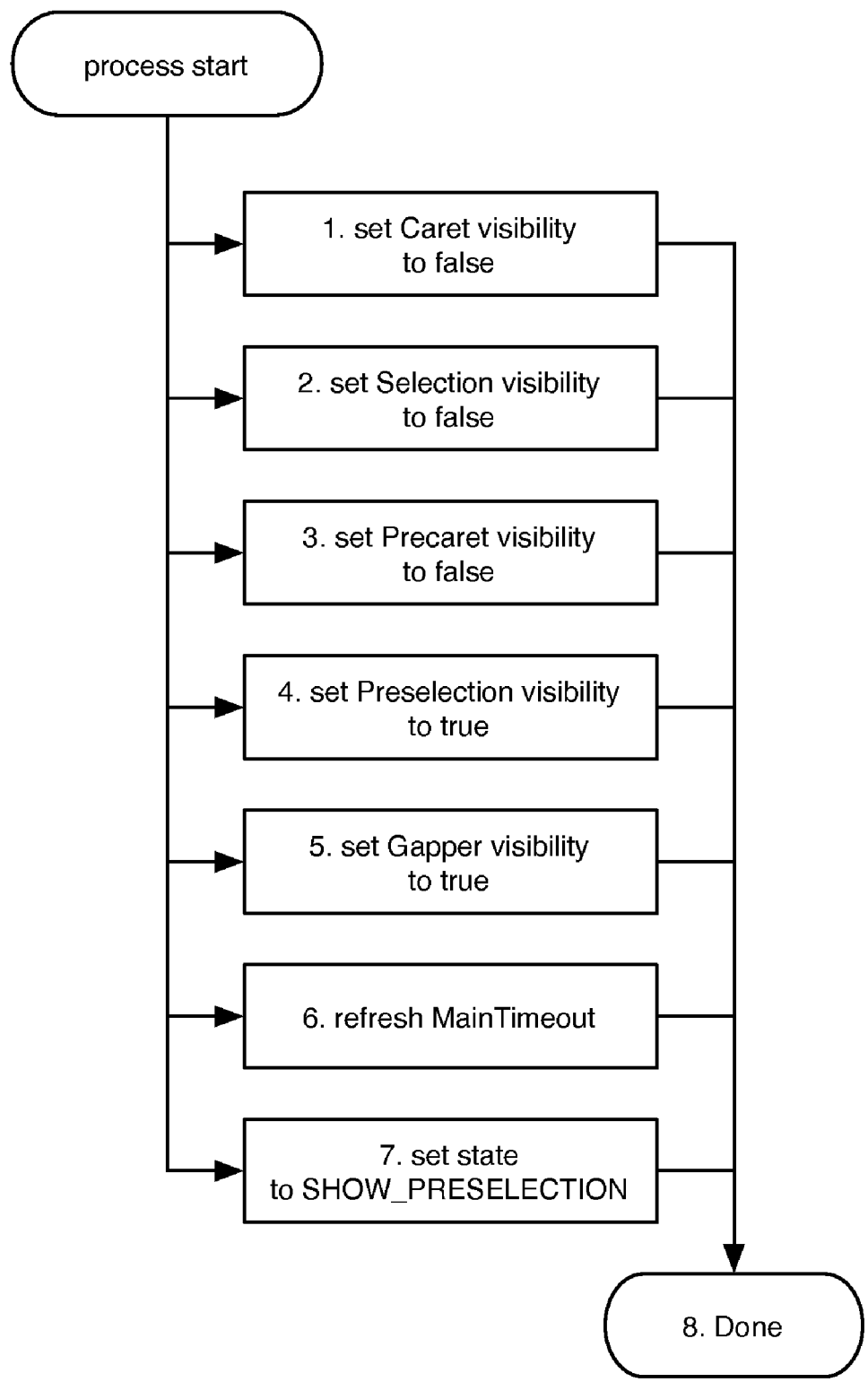
Fig. 65. The showPreselection process

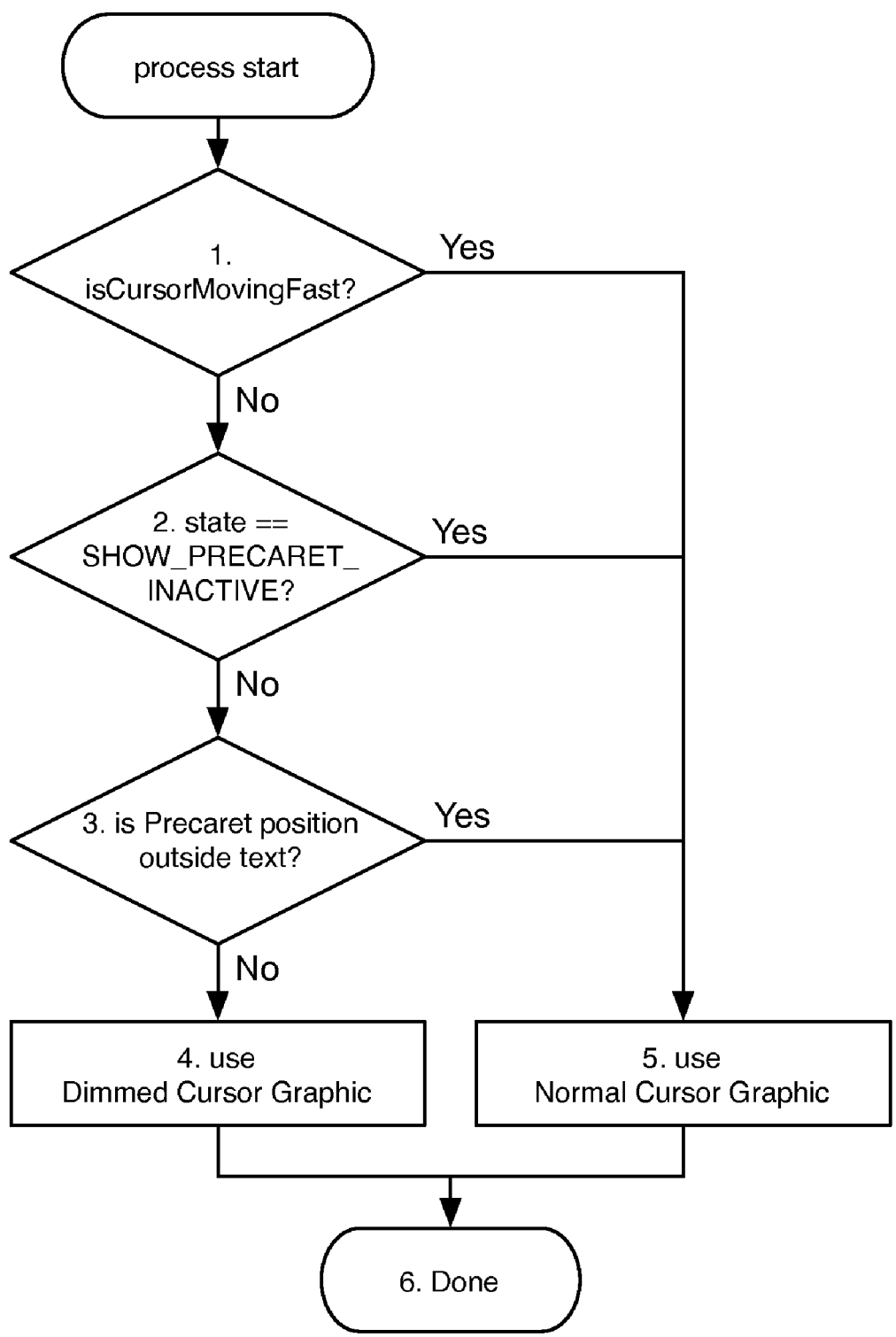
Fig. 66. The updateCursorAppearance process

SYSTEM OF GUI TEXT CURSOR, CARET, AND SELECTION

RELATED APPLICATION

This application is related to U.S. Provisional Patent Application Ser. No. 60/614,211, filed Sep. 28, 2004, and entitled "Improved system of GUI text cursor, caret, and selection". This application incorporates such application hereinto in its entirety by reference, and claims priority thereto.

TECHNICAL FIELD

The invention is related to user interaction systems for editing text using a bitmap display, especially relating to seeing and moving a text Cursor, placing and moving a Caret (insertion point), making and extending a text Selection, and seeing indicia of certain normally-invisible characteristics of the text data, such as space and tab characters, line-wrapping within a paragraph, paragraph breaks, indents, and vertical and horizontal gaps between paragraphs and between text and other graphical elements.

BACKGROUND OF INVENTION

Existing GUI text editing practice has a Cursor that floats unchanged over the text, and provides no indication of where in the text the Caret will be placed when the user clicks. Existing practice is also either all-or-nothing when it comes to showing normally-invisible characteristics of the text data only, with an on-off feature called "Show Invisibles", "Show White Space", or the like, which applies to all spacing characters in the entire file. Only actual spacing characters in the text data are shown, and other kinds of invisible characteristics, such as line-wrapping within a paragraph, paragraph breaks, indents, and vertical and horizontal gaps between paragraphs and between text and other graphical elements are not shown.

The combined results of all of these factors is that it is difficult to position the Cursor correctly, so that when the Mouse is clicked, the Caret will be in the desired location.

I am aware of only one piece of art in GUI text editing that is relevant as background: The text drag-and-drop feature of the Sun Microsystems Java Swing UI toolkit does show a continuously-updated indicator of where dragged text will be inserted as you drag the Cursor over the text; however, an icon at the cursor largely obscures this indicator until a version of their system released after the priority date of this patent application.

TECHNICAL PROBLEM

Glossary

In this document we use the term 'Mouse' to refer to a traditional mouse, a trackball, a trackpad, an IBM TrackPoint, or any other pointing device capable of being used to move the Cursor to a desired individual pixel location on a graphical display. The term 'clicking the Mouse' and 'Mouse click' refer to the initiation of the standard GUI system mouse click event, whether it be initiated by clicking of a button, by tapping on a trackpad, or by performing a corresponding operation on another type of pointing device.

An interactive graphical user interface Text Component is any GUI component that allows viewing and modifying text as a sequence of individually-selectable characters, as distinguished for example from a component that manipulates a sequence of text only as a unit, from a component that manipulates text represented as an image, or from a component that manipulates the shapes of glyphs in a font. We use the term Text to include any sort of glyphs, be they alphabetical, musical, or other symbols.

A GUI Text Component is usually thought of as having three parts:

Model

The Model is a sequence of characters. Most Characters represent the familiar text and space characters but some can represent other objects such as images or other objects that flow inline within a paragraph of text as if they were text characters. A simple text editor application might contain a single Model representing the entire contents of a file. A more complex document editor application supporting tables and page layout will typically contain a data structure of higher-level objects, some of which can be instances of a Model of the type we are discussing in this document.

The number of characters in the sequence is the model-Length, and each character is at a position, numbered from '0' to 'modelLength−1'. The position 'modelLength' represents the position of the end of the data; that is, the position immediately after the last character.

A Character Range identifies 'start' and 'end' positions within the Model or equivalently a 'start' position and a rangeLength. RangeLength can be 0, and the equation 'rangeLength=end−start' holds true. See FIG. 1.

A Model content modification is either a deletion, an insertion, or a combined operation comprising a deletion followed by an insertion. A deletion specifies a character range of the Model. An insertion specifies a position and a number of characters to be inserted from the sequence following the position.

The Model also functions as a sequence of one or more Paragraphs. Each Paragraph is a Character Range that ends either with a ParagraphEnd Character or at the end of the Model.

View

The View shows each Paragraph on the computer Display as one or more rows of text characters. (This document uses the term 'row' instead of the usual term 'line' when discussing a horizontal run of displayed characters for clarity.) The View 'flows' characters into the first row, then if there are too many to fit, the View typically 'wraps' the paragraph at the end of a word or perhaps at the end of a syllable (adding a hyphen) and tries again to show the remaining text from the paragraph on a row directly below the previous row, repeating the process until the entire paragraph is displayed.

Controller

The Controller responds to user input gestures from one or more mice and one or more keyboards. Some of these gestures can designate the position of an Insertion Point while others can designate the position and length of a Selection. The Insertion Point is a position within the Model, and the Selection is a Character Range within the Model. (In most GUI systems, the Selection is a single range, but in others the Selection can be a set of many noncontiguous ranges. Henceforth for simplicity we will speak as if the Selection represents a single range.) The Insertion Point can be thought of as a Selection of length 0.

The user may commit an input gesture that is intended to set or modify the Insertion Point or the Selection. Since the Insertion Point and the Selection cannot both be active, such a gesture may cause one to become inactive and the other to become active.

When the user commits an input gesture that is intended to set or modify the Insertion Point or the Selection, the affected objects (Caret and/or Selection) immediately notify the View of the regions of the display that are affected. The View then calls for the painting of the affected regions of the display by the objects responsible for them. For example, if the Caret had been active and the Selection is to become active instead, the View tells the text in the region previously inhabited by the Caret to paint its pixels, tells the Selection to paint its pixels, and tells the text inhabiting the region of the Selection to paint itself.

The invention specifically addresses the interactivity user experience, altering traditional View and Controller behavior while leaving traditional Model behavior unaltered.

In traditional practice, a Text Component responds to a user's input by manipulating these three visual objects in the View:

Cursor

The Cursor is a visual indication of the position of the Mouse. The 'Cursor Hotspot' is the exact pixel location designated by the Cursor. The Cursor is typically displayed as a black I-beam-like superimposed image, possibly with exclusive-or display mode (so that white areas covered by it become black, and black areas become white). Traditionally, the text Cursor maintains the same appearance at all times while the Cursor Hotspot is inside a text editing component. See FIG. 2.

Selection

The Selection is the term for a range of characters in the Model (visually marked in the View) designated for user-initiated operations to follow, such as changing text font or size, copying to the clipboard, inserting new text, etc. See FIG. 3.

Caret

The Caret is a visual indication of the Insertion Point. The Insertion Point identifies the position in the Model for newly-inserted text. The Caret is traditionally a vertical line (usually black, often blinking) just inside the left edge of the box enclosing the character immediately following the Insertion Point. The Caret can be thought of as an indicator for the position of a zero-length Selection. In some existing GUI implementations, while a Selection exists, the Caret is displayed at one end of the Selection; in others the Caret is not displayed while a Selection exists (which latter embodiment is preferred by the invention and implemented in the prototype). See FIG. 4.

A Highlight is a View object that is responsible for painting all characters in a Character Range with a distinctive appearance. The Selection and the Caret, for example, are Highlights. A Highlight is attached to Character Range in a Model. A Model manages all Highlights attached to it and ensures that the start and end offsets of each highlight are appropriately adjusted when an insertion or deletion takes place in the Model affecting the start and/or end of any Highlight.

A Highlight knows how to paint its graphical rendering in the View. Typically (and in all Highlights discussed in this document) a highlight paints itself in a graphics layer behind the characters within the Highlight's range. (See "Highlight graphics layers" below.) The Model triggers Highlight painting as necessary to keep the View in sync with modifications to the Model.

A Whitespace Character is an invisible character that is used to effect spacing between characters or groups of characters in a row of text. A Whitespace Character can be a space, no-break-space, tab, or other invisible spacing character, not including the ParagraphEnd character, which is not a Whitespace Character by this definition.

A Model Whitespace Gap is a range of Whitespace Characters in the Model bordered on the left either by a non-Whitespace Character or by position 0 and bordered on the right by a non-Whitespace Character or position 'model-Length'. To be 'in a Model Whitespace Gap' means to be at a position of one of the Whitespace Characters in the Gap or at the position immediately to the right of the last Whitespace Character in the Gap (i.e., the end of the Gap).

A View Whitespace Gap is the View's representation of a Model Whitespace Gap, and may span two or more rows of text rendered from a paragraph. To be 'in a View Whitespace Gap' is to be positioned in the View such that the corresponding position in the Model is in a Model Whitespace Gap.

A Vertical Gap is the View's representation of a Vertical Gap, sometimes called "leading" or "padding", above the first paragraph, between a paragraph and the next, or after the last paragraph. A Vertical Gap is typically represented in the Model as Paragraph attribute metadata.

A Soft Return is either a character in the Model or metadata attached to a character in the Model. It causes the Paragraph text to wrap to the next row without ending the Paragraph. For example, the <br> code in HTML functions as a Soft Return (usually represented in the Model as metadata attached to its position in the Model).

A Ligature is a text character that represents two or more text characters. For example, in English, the three characters 'f f i' can be rendered as a Ligature, the single character 'ffi' ('ffi', Unicode hexadecimal FB03).

In the context of discussing the flow of text, we assume the left-to-right/top-down European writing system, in which text characters flow horizontally across a row from left to right, then across a row below that row, etc. The invention applies as well to writing systems with other flow direction rules, such as right-to-left/top-down and top-down/right-to-left by applying appropriate rotation and/or reflection transformations to the description of the invention.

Problems with Traditional Practice

Fundamentally there are these problems:

The position where the Caret will be placed when the Mouse is clicked is often not clear; it should always be clear while the text cursor is active.

The Cursor obscures text characters; it should not.

The number, positions, and types of spacing characters in a Whitespace Gap is hard to determine, and a Vertical Gap is hard to see; these facts about the text should be easier to see.

These problems manifest in many little ways, which all add up to a poor user experience. The invention solves all of these problems. The accumulated effect is improvement in the interactivity of the user experience. Once you have experienced the new way, the old way seems very lacking indeed.

Detailed Recitation of Problems with Existing Art

Below are analyses and illustrations of 22 problems with existing art. Among these many problems, certain themes occur often:

It is hard to see certain facts about the text, especially about whitespace gaps. (All Problems)

To answer a question about a difficult-to-see fact about the text, the user has to click the mouse, type one or more arrow keys, or command the software to reveal invisible characters. (Problems 1-4, 5, 7-22)

The smaller the displayed size of the text, the worse the problem. (Problems 3, 6, 9, 10)

The user has to take a little extra time and effort in positioning the Cursor. This theme merits its own Problem number (5). (Problems 1-4, 22)

After clicking, if the user realizes that the mouse was not positioned correctly for the click, they have to take corrective action:

move the mouse and click again use arrow key(s)
type a different key than intended (e.g., forward-delete instead of backspace) (Problems 1, 2, 4, 6-8)

The Problems below are presented in a sequence designed for ease of reading, not in order of importance.

Notes about the illustrations in this section (FIGS. 5 through 27):

Each illustration has two screen shot images: "Old way" and "New way".

Detailed explanations of the features illustrated in the "New way" examples will follow below in the "Features of the Invention" section.

The Cursor is always in the same pixel location in the "Old way" and its corresponding "New way" screen shots.

The Cursor in the "New way" image is quite faint. That is an intentional feature of the invention. The interaction feedback of the invention makes it clear by context where the Cursor is, so it's an advantage for the Cursor to be unobtrusive.

Problems with Clicking and Dragging

Problems 1 through 5 in this section focus on the process of choosing the Cursor position at which to click the Mouse so the Caret will be placed to the desired character position. These problems also pertain to the process of choosing the Cursor position at which to click the Mouse to begin dragging out a Selection.

Problem 1. Approximately in the middle of a character is an invisible vertical dividing line. If the Cursor Hotspot is to the left of the dividing line, the Caret will be placed before that character when the Mouse is clicked; if the Cursor is to the right of the dividing line, the Caret will be placed after that character when the Mouse is clicked. The nearer the Cursor is to this dividing line, the harder it is to know where the Caret will be placed when the Mouse is clicked. (Different GUI text components place this dividing line slightly differently.) See FIG. 5.

Problem 2. Between two rows of text, one directly below the other, somewhere between the two rows is an invisible horizontal dividing line. If the Cursor Hotspot is above the dividing line, the Caret will be placed in the row above; if the Cursor is below the dividing line, the Caret will be placed in the row below. The nearer the Cursor is to the dividing line, the harder it is to know where the Caret will be placed when the Mouse is clicked. See FIG. 6.

Problem 3. The text Cursor obscures the character(s) underneath it. See FIG. 7.

Problem 4. When you shift-click to make a new Selection or to modify an existing Selection, it can be difficult to know what you will get. Perhaps the Caret is not where you think it is, or perhaps the software advances the Selection a word at a time, so clicking anywhere in a word will actually extend the Selection to the end of the word, or perhaps you're using software that extends a selection differently from the software you're used to. See FIG. 8.

Problem 5. As a result of Problems 1, 2, 3, 4, and 22, as you move the Cursor over text, you have to take a little extra time and effort to place the Cursor just right to be sure the Caret or Selection will go where you want it to go. Even with the extra time and effort, you often make a mistake, and you have to adjust by moving the Caret or by typing different keys than you had planned (e.g. forward-delete instead of backspace).

Problems with Dragging Out a SELECTION

Problem 6. The text Cursor obscures the leading edge of the Selection, as well as the character(s) underneath the Cursor near the leading edge of the Selection. See FIG. 9.

Problems with Discerning Spacing

Problem 7. If several vertically-adjacent rows of text start with a wide Whitespace Gap, it can be hard to place the Cursor at the start of the desired row because there is no horizontal guide across the Whitespace Gap leading to the visible characters. (This is a worst-case version of Problem 2.) See FIG. 10.

Problem 8. If there are two or more characters in a Whitespace Gap, the Cursor gives no assistance in determining the boundaries between Whitespace Characters, so prediction of where the Caret will be placed when the Mouse is clicked can be very difficult, especially when tab characters are present. See FIG. 11.

Problem 9. It can be difficult to tell whether or not a Whitespace Character is present between two non-Whitespace Characters. See FIG. 12.

Problem 10. In a Whitespace Gap, it can be hard to tell the difference between a one-space gap and a two-space gap. See FIGS. 13 & 14.

Problem 11. In a Whitespace Gap, if there are many spaces, it is difficult to count them. See FIG. 15.

Problem 12. In a Whitespace Gap, it is hard to tell if the spacing is the result of ordinary space characters, no-break-space characters, and/or tab characters. See FIG. 16 (no-break-space characters) and FIG. 11 (tab characters).

Problem 13. It can be hard to tell where the left edge of the text is in the window because different text components use different amounts of left margin space. See FIG. 17.

Problem 14. If there is a blank area to the left of the leftmost visible character on a row of text, it might be caused either by Whitespace Characters or by indentation or other alignment formatting features, such as centering. The Cursor gives no indication as to which is the case. This can especially be a problem in a text document prepared by an inexperienced person who uses space characters instead of alignment features for formatting. See FIG. 18.

Problem 15. In the area to the right of the rightmost visible character on a row of text, there may be one or more Whitespace Characters. The Cursor gives no indication of these. This can especially be a problem in a text document prepared by an inexperienced person who uses space characters instead of alignment features for formatting. See FIG. 19.

Problem 16. It is impossible to tell if a Vertical Gap between the end of one paragraph and the start of another is caused by paragraph vertical padding or by blank line(s). See FIGS. 20 & 21.

Problem 17. It is impossible to tell if the end of a row is the end of a paragraph or simply the end of a row after which there is more paragraph text which wraps to the next row. See FIG. 22.

Problem 18. It is impossible to tell if the start of a row is the start of a paragraph or simply the continuation of a paragraph whose text has wrapped from the previous row. See FIG. 23.

Problem 19. It is impossible to tell if the end of a row is the end of a paragraph or just a Soft Return. See FIG. 24.

Problem 20. If the Cursor or Caret is at the upper-left corner of the editing area, you can't tell if that is the start of the Model. See FIGS. 25 & 26.

Problem 21. In many text editing implementations, it is impossible to tell if a row of text is the last row of the Model. See FIG. 27.

Problem 22. In some applications, isolated blocks of text are intermingled with other objects, such as images and tables, as in a web page or other page layout. In such a situation, it can be especially difficult to know where the Caret will be placed when the user clicks the mouse because it can be impossible to tell which of two nearby text objects owns a particular area of whitespace.

This problem is a worst-case scenario of Problems 7, 13, 14, 15, and 16.

Traditional Problem Workarounds

Problems 8 through 21 can be worked around in some traditional systems by using a feature called "Show Invisibles", "Show Control White Space", or the like. This workaround has drawbacks:

All whitespace in the entire window is cluttered with little markings for the duration that the feature is active.

You have to go to the trouble of turning the feature on and off.

Problems 7, 9, 10, 11, 13, 14, 15, 16, 20, and 21 in traditional systems have to do with clicking to place the Caret and finding the Caret in a different position than intended. This unwanted result can be worked around by moving the cursor and clicking again,
by moving the Caret with the arrow keys, or
by typing a different key than planned, for example, typing Forward Delete instead of Delete, when the Caret ended up one position to the left of the intended position.

By contrast, the operation of the invention prevents these problems, completely obviating the need for these workarounds.

Technical Solution

Features of the Invention

The invention's several features solve the problems enumerated above.

Enhanced Cursor

Addressing Problems 3, 6:

The invention's Enhanced Cursor dynamically shows one of two graphics depending on circumstances: the Normal Cursor Graphic and the Dimmed Cursor Graphic, a less-unobtrusive, lighter version of the Normal Cursor Graphic, which in the preferred embodiment has only top and bottom parts and no central vertical portion. The invention shows the Dimmed Cursor Graphic while the Cursor Hotspot is over a Character and is either motionless or moving slowly. Otherwise, the invention shows the Normal Cursor Graphic (i.e., when the Cursor is either moving quickly or the Cursor Hotspot is not over a Character). See FIG. 28.

Precaret

Addressing problems 1, 2, 5, 8, 9, 10, 11, 13, 14, 15, 16, 20, 21, 22:

The invention maintains a Highlight called the Precaret, which in the preferred embodiment looks exactly like the Caret, except that it is a different color from the Caret and doesn't blink. (See "Highlight colors" below.) The invention continuously updates the position of the Precaret so that the Precaret indicates the position where the Caret will be placed when the user clicks the Mouse. See FIG. 29.

So that the Precaret can be seen even when it occurs within a Selection, the invention paints the Precaret Highlight in a graphics layer in front of the Selection Highlight, and the Precaret color is clearly distinguishable from the Selection color. (See "Highlight graphics layers" and "Highlight colors" below.) See FIG. 30.

Precaret variations—The Precaret takes on a distinctive look to elucidate each of several situations.

The Default Caret Appearance is used wherever the other Caret Appearances are not used, such as for example between two characters in the middle of a row of text.

Addressing Problem 17:

The Wrap-to Caret Appearance indicates the end of a row that wraps to the next row. In the preferred embodiment, this appearance is achieved by adding to the normal Precaret a semicircular arrow that begins slightly above and to the right of the bottom of the vertical portion of the Precaret and curves around clockwise to point at a point three pixels below the bottom of the vertical portion of the Precaret. See FIG. 31.

Addressing Problem 18:

The Wrapped-from Caret Appearance indicates the start of a row that wrapped from the previous row. In the preferred embodiment, this appearance is achieved by adding to the normal Precaret a semicircular arrow that begins slightly above and to the left of the top of the vertical portion of the Precaret and curves around counterclockwise to point at a point three pixels down from the top of the vertical portion of the Precaret. See FIG. 32.

Addressing Problem 19:

The Soft Return Caret Appearance indicates the end of a paragraph row that was forced by a Soft Return in the Model to break to the next row (thus prematurely wrapping the text without ending the current paragraph). In the preferred embodiment, this appearance is similar to the Default Caret Appearance except that it is rendered as a dotted line instead of as a solid line. See FIG. 33.

Addressing Problems 20, 21:

The Start-End Caret Appearance indicates the start or end of Model data (i.e. Model position 0 or modelLength). In the preferred embodiment, the Start-End Caret Appearance is 3× the thickness of the Default Caret Appearance. See FIGS. 34 & 35.

Enhanced Caret

Addressing Problems 17, 18, 20, 21:

The invention supplies an enhanced Caret that enhances the traditional Caret with the same distinctive appearances in special situations as displayed by the Precaret, described above. The Caret and Precaret are different colors, so that they are easily distinguished. (See "Highlight colors" below.)

Gapper

Addressing Problems 7, 8, 9, 10, 11, 12, 13, 14, 15, 16, 17, 18, 20, 21, 22:

The invention maintains a Highlight called the Gapper. The Gapper is composed of two subobjects, the Whitespace Gapper and the Paragraph Gapper.

The Whitespace Gapper indicates Whitespace Characters within a View Whitespace Gap. See FIG. 36.

If the Option key is down (on Mac; Alt key on Windows, or equivalent for some other platform), the Whitespace Gapper indicates every Whitespace Gap in the current row as well as space gaps involved in wrapping from the previous row and/or to the previous row. See FIG. 37.

The Paragraph Gapper indicates extra vertical space (if any) between paragraphs. (Such vertical space might be part of the paragraph above or the paragraph below, or some of each.) In the preferred embodiment, the vertical gap is represented by a rectangle whose height is the height of the gap, whose left edge is aligned with the leftmost extent of either the paragraph above or the paragraph below, whichever is leftmost, and whose right edge is aligned with the rightmost extent of either the paragraph above or the paragraph below, whichever is rightmost, except that the right edge of the rectangle may be extended if necessary so that the rectangle is at least 20 pixels wide. In the preferred embodiment, the top and bottom edges of the rectangle are painted with horizontal lines of the Paragraph Gapper Border Color, and the interior of the rectangle (if any) is painted with the Gapper Background Color. (See "Highlight colors" below.) Alternate embodiments could use other colors and/or patterns to indicate the vertical gap. See FIG. 38.

The Gapper illuminates the Whitespace Gap (if any) and/or Paragraph Gap (if any) containing the current position of the Gapper's Master. (A Whitespace Gap or Paragraph Gap contains a position if gapStart≦position≦gapEnd.) The Gapper's Master is initially the Precaret, then subsequently it is either the Precaret or the Caret, whichever was active more recently. For example, in FIG. 36, the Gapper's Master is the Precaret, and the Whitespace Gapper is active because the position of the Precaret is within the Whitespace Gap. In FIG. 38, the Gapper's Master is the Precaret, and the Paragraph Gapper is illuminating the gap between paragraphs because the Precaret is at the start of the Paragraph Gap (i.e. at the end of the preceding paragraph). (The Paragraph Gap would also be illuminated if the Precaret were at the start of the following paragraph.) In FIG. 15, the Gapper's Master is the Precaret, which is at the end of the Whitespace Gap.

The Whitespace Gapper illuminates a View Whitespace Gap by indicating Whitespace Characters within the gap with Gap Marks as appropriate. The set of Gap Marks comprises:
  Minor Space Mark,
  Major Space Mark,
  Tab Mark,
  No-Break Minor Space Mark,
  No-Break Major Space Mark, and
  additional kinds of Space Mark for any additional kinds of Whitespace Character that the embodiment wishes to distinguish.
  Addressing Problem 11:
  Space Marks—The Gapper indicates Whitespace characters using a Space Marks. In the preferred embodiment, there is a Space Mark to the left and right of every Whitespace Character indicated by the invention. A Space Mark has a vertical portion, which can be either normal height or extra-tall height. The invention alternates the two heights to make it easier for the user to count Space Marks. A normal height Space Mark is called a Minor Space Mark, and an extra-tall Space Mark is called a Major Space Mark. See FIG. 39.

The invention always indicates the left side of a Tab Character with a Tab Mark (which in the preferred embodiment is the same height as a Major Space Mark). In the preferred embodiment, the invention indicates the left side of the first character of a Whitespace Gap (if the character is not a Tab character) with a Minor Space Mark. (An alternate embodiment could indicate the first character with a Major Space Mark, but that is not recommended.) Otherwise, the invention indicates the left side of every character in a Whitespace Gap (including the first non-whitespace character at the end of the Whitespace Gap) with a Minor Space Mark unless the Space Mark Distance Calculation deems that the left side of the character should be indicated with a Major Space Mark.

A Space-Counting Start Position is a model position from which counting begins for purposes of determining how to alternate Minor Space Marks and Major Space Marks. The start of a Whitespace Gap is always a Space-Counting Start Position, and a model position at which there is a Tab character is also always a Space-Counting Start Position. The Backwards Distance of a character is defined as the number of model positions from the character backwards to the first-encountered Space-Counting Start Position. The Space Mark Distance Calculation dictates the use of a Major Space Mark instead of a Minor Space Mark if the Backwards Distance modulo N equals 0, where N is 4 in the preferred embodiment.

In the preferred embodiment, the Minor Space Mark is a one-pixel-thick vertical line ⅙ the height of the Caret, the Major Space Mark is a one-pixel-thick vertical line ⅓ the height of the Caret (both numbers rounded up). Major and Minor Space Marks are painted such that they cover the same pixels as the bottom portion of the Caret (with the Caret shape and position of the preferred embodiment).

Similarly, the same rules described below for employing a Super Gap Mark at the left edge of Whitespace characters apply to the use of a Super Gap Mark at the right edge of a Whitespace Gap. FIG. 39 illustrates the employment of a Minor Space Mark at the right edge of a Whitespace Gap. FIG. 40 illustrates the employment of a Major Space Mark at the right edge of a Whitespace Gap.

A Gap Mark may be extended upwards with a Super Gap Mark. A Super Gap Mark is the same shape and color as a Minor Space Mark, positioned such that it extends a Major Space Mark, Major No-Break Space Mark, or Tab Mark upwards. See FIG. 40.

Addressing Problem 12:
Tab Mark—The Gapper uses a Tab Mark to indicate a tab character. In the preferred embodiment, a Tab Mark is the same as a Major Space Mark plus it has a short horizontal line hanging perpendicularly to the right from the bottom of the vertical portion. The length of the horizontal portion is the same as the length of the vertical portion or shorter if necessary to keep the horizontal portion from touching the following Space Mark. See FIG. 41.

No-Break-Space Mark—The Gapper uses a No-Break-Space Mark to indicate a no-break-space character (which can be encoded, for example, as " " in HTML). In the preferred embodiment, a No-Break-Space Mark is the same as a (Major or Minor) Space Mark plus it has a short horizontal line hanging to the left from the bottom of the vertical portion of the following character's Mark. The length of the horizontal portion is the same as the length of the vertical portion of the Space Mark or shorter if necessary to keep the horizontal portion from touching the vertical portion of the No-Break-Space Mark. See FIG. 42.

Color details—So that the Whitespace Gapper is visible within a Selection, the Gapper Highlight paints itself in a graphics layer in front of the Selection Highlight, and when the Whitespace Gapper paints within the Selection or Preselection, the Whitespace Gapper's background color adapts to the situation so that it is clearly distinguishable from the Selection color and from the Preselection color. (See "Highlight graphics layers" and "Highlight colors" below.) In the preferred embodiment, the Whitespace Gapper and the Paragraph Gapper both use a pale background color; the Paragraph Gapper uses a Gap Mark color, and the Paragraph Gapper uses a foreground color for Gap Marks and a pale background color that fills in between the Gap Marks. In the preferred embodiment, the gapper color is the same as the Precaret color See FIG. 43.

Preselection
Addressing Problem 4

The invention maintains a Highlight called the Preselection, which looks exactly like the Selection, except that it is a contrasting color from the Selection. The illustrations use blue for the selection and orange for the preselection. (See "Highlight colors" below.)

When the Cursor moves while the shift key is held down, the invention continuously updates the Preselection so that the Preselection indicates the range that will be covered by the Selection when the user clicks the Mouse. In other words, the Preselection gives a preview of shift-click selection.

While the Cursor moves while the shift key is held down, if the Cursor is in such a position that there will be no Selection when the Mouse is clicked, then the invention displays the Precaret at that position instead of the Preselection. The Preselection and the Precaret are never both visible at the same time, and the Preselection and the Selection are never both visible at the same time.

The color of the Preselection is such that it can be distinguished from the Selection and from the Precaret. (See "Highlight colors" below.) See FIG. 44.

PrecaretClicker

Addressing Problem 4

The invention employs a PrecaretClicker object, which plays a sound whenever there is a change in the model position of the Precaret or the live end of the Selection or Preselection. The preferred embodiment employs different sounds depending on whether the offset is at the start or end of the Model or if the character at the offset is a ParagraphEnd character, whitespace, or visible character. The PrecaretClicker ensures that clicks play only when the model position changes at a slow enough rate to allow individual clicks to be distinguished by the user.

Highlight Graphics Layers

Some features are implemented with Highlights. Those Highlights and the features to which they belong are listed in Table 1 in order of graphics drawing layer from front to back in the preferred embodiment. The text component paints text components in front of the frontmost Highlight. An alternate embodiment (as in the prototype source code provided) could get by with the Cursor being moved frontwards to where it is in front of the Precaret. (The prototype settles for this embodiment so it doesn't have to modify the Java Swing toolkit itself.)

TABLE 1

Features, Highlights, and drawing layers.

| Feature | Highlight | Graphics layer |
| --- | --- | --- |
| Enhanced Caret | Enhanced Caret | 1 (front) |
| Precaret | Precaret | 2 |
| Gapper | Gapper Marks | 3 |
| Cursor | Cursor | 4 |
| Gapper | Gapper Background | 5 |
| Preselection | Preselection | 6 |
| Enhanced Selection | Enhanced Selection | 7 (back) |

(Two other features not involving Highlights are The Enhanced Cursor and the Cursor Clicker.)

In the future, other feedback features could be added, such as haptic feedback indicating Precaret position changes.

Highlight Colors

In the preferred embodiment,
the same hue (blue) is used for the Caret and the Selection,
the same hue (brown) is used for the Precaret, Preselection, Gapper Space Marks, and Gapper Paragraph Border,
the two aforementioned hues are complements of each other to maximally distinguish the Caret and Selection from the Precaret and Preselection, and
the values of the Caret and Precaret colors are darker than the values of the Selection and Preselection to maximally distinguish the Caret and Precaret from the Selection and Preselection, and
the RGB values for the default colors are as follows:
0, 97, 209—Caret
181, 216, 255—Selection
156, 83, 0—Precaret
255, 205, 148—Preselection
190, 152, 116—Gapper Space Marks (lighter version of Precaret)
190, 152, 116—Gapper Paragraph Border (same as Gapper Space Marks)
235, 235, 235—Gapper Background
190, 207, 225—Gapper Background in Selection
217, 193, 166—Gapper Background in Preselection Other embodiments could distinguish these colors in different ways. In particular, an embodiment could allow the user to choose one or more of the colors. In such a case, the embodiment could automatically calculate some or all of the remaining colors from the ones the user has chosen so that the various colors are distinguishable, perhaps as outlined above for the preferred embodiment.

Advantageous Effects

Uses

The invention's features improve the user interaction of Caret and Selection manipulation in text GUI components. The Precaret, like the Caret, indicates a position between text characters, but unlike the Caret, the Precaret continually tracks the Cursor, jumping from position to position to indicate exactly where the Caret will be placed when the mouse is clicked. The Gapper visually indicates a gap of one or more white space characters in the text or a gap of white space between paragraphs; the Gapper tracks either the Precaret or the Caret, whichever moved last. An enhanced Cursor switches to a less-obtrusive form while it is over text so as not to obscure the position of the Precaret while moving the mouse or the leading edge of the Selection while dragging the mouse. The Caret and Precaret change shape to indicate a special feature of a position within the text, such as the wrapping of one text row to the next.

An additional use of the invention is to use the known position of the Precaret as the basis for improvement in the display of formatting information and for direct manipulation of formatting information. Holding down a shift or other key while mousing over the document would cause formatting information about the current position of the Precaret, Gapper, or Selection position to display. Dragging the cursor would influence formatting metadata such as paragraph spacing, image position, ruler margins, and tab stops. Clicking the mouse specially, such as with right-click, would display a variety of editing and formatting functions that would be directly applied to the text or the formatting metadata.

A third use of the invention is to use the ability to detect areas of text and therefore detect areas of non-text to place a Precaret- or Preselection-like indication at the precise location of the nontext Object (such as an image, rule, or border) nearest the cursor in the non-text area. The Cursor location in the non-text area can be used as the basis for information display or format direct manipulation of the object(s) in the vicinity of the Precaret. Dragging the cursor would influence object-specific formatting information. Right clicking the Mouse would display a variety of editing and format functions that could be directly applied to the non-text area.

A fourth use of the invention is to move seamlessly from text areas to non-text areas with absolute knowledge of exactly where the Cursor is located in both text and non-text graphic areas and the related use of linked formatting and editing features.

Accessibility improvement & Repetitive Stress Injury Reduction

The invention improves usability
by improving visual mouse position feedback in text (Precaret, Gapper, see above)
by optionally providing text cursor movement auditory feedback (PrecaretClicker, see above)

by illuminating text whitespace gaps in a much more easily visible yet unobtrusive way than the traditional "Show invisibles" features of text editors. (Gapper, see above)

People with visual and/or motor-skill disabilities will especially benefit from the fact that the invention makes cursor positioning much easier. Furthermore, because the invention lessens the time and muscle use required to accurately position the cursor, the invention should help to reduce the incidence of repetitive stress injury, such as carpal tunnel syndrome, associated with mouse use in some individuals.

DESCRIPTION OF DRAWINGS

FIG. 1. The Model

FIG. 2. A traditional text Cursor

FIG. 3. A selection

FIG. 4. The Caret

FIG. 5. Will the Caret go to the 'n' at left or to the 'c' at right? Answer: to the 'c' because that's where the Precaret is.

FIG. 6. Will the Caret go to the row above or the row below? Answer: Above because that's where the Precaret is.

FIG. 7. The traditional Cursor obscures what is behind it. The new cursor does not.

FIG. 8. What will the Selection be after shift-click? Answer: When you click with the shift key down, what you see is what you'll get.

FIG. 9. The Cursor gets in the way while selecting. The Dimmed Cursor graphic is less obtrusive.

FIG. 10. Finding the left edge of a line with a long indent. The illuminated space gap provides orientation.

FIG. 11. Where will the Caret go? Answer: to the 's' because that's where the Precaret is.

FIG. 12. Is there an unwanted space character here in this letter-spaced word? Answer: Yes; one; the Gapper shows it clearly.

FIG. 13. Is there one space character there or two? Answer: One.

FIG. 14. Is there one space character there or two? Answer: One; it looks like more only because the paragraph is right-justified.

FIG. 15. How many space characters are there? Answer: easy to see there are 8.

FIG. 16. What kind of space is that? Answer: a no-break space, as indicated by the reverse 'L' mark.

FIG. 17. Is that blank area at the left side a margin or is there a Whitespace Gap there? Answer: It's a Whitespace Gap, as indicated by the Precaret and the Gapper.

FIG. 18. Are there Whitespace Characters to the left, or is this an indent? Answer: It's an indent because otherwise Whitespace Characters would be indicated.

FIG. 19. Are there Whitespace Characters to the right? Answer: Yes, two of them, as indicated by the Gapper.

FIG. 20. Is there a blank line there or is it a Vertical Gap? Answer: Its a blank line; as indicated by the Precaret.

FIG. 21. Is there a blank line there or is it a Vertical Gap? Answer: It's a Vertical Gap, as indicated by the Gapper.

FIG. 22. Is the end of this line the end of the paragraph, is it a Soft Return, or does it wrap to the next row? Answer: It wraps. (Note the arrow at the bottom of the Precaret and the Space Mark at the start of the next row.)

FIG. 23. Is this the start of a paragraph, or did the previous row wrap to here? Answer: The previous row wrapped. (Note the arrow at the top of the Precaret and the Space Mark at the end of the previous row.)

FIG. 24. Is that the end of the paragraph, or is it a Soft Return? Answer: a Soft Return, as shown by the Soft Return Caret Graphic.

FIG. 25. Is this the start of the Model? Answer: Yes because the Precaret is thick.

FIG. 26. Is this the start of the Model? Answer: Yes because the Caret is thick.

FIG. 27. Is this the end of the text in the Model? Answer: Yes because the Precaret is thick.

FIG. 28. Dimmed Cursor Graphic and Normal Cursor Graphic

FIG. 29. The Precaret (shown in brown). Time-series shows how the Precaret jumps from position to position as the cursor moves. The Caret is shown at right (in blue) for comparison.

FIG. 30. The Precaret inside a Selection.

FIG. 31. The Precaret, at the end of a row that wraps to the next row.

FIG. 32. The Precaret, at the start of a row that wrapped from the previous row.

FIG. 33. The Soft Return Caret Appearance, at the position of a Soft Return, which breaks the row without ending the paragraph.

FIG. 34. The Start-End Caret Appearance, at the start of the Model.

FIG. 35. The Start-End Caret Appearance, at the end of the Model.

FIG. 36. The Gapper, illuminating 8 space characters at the start of a row. The Precaret is one position to the left of the 'S'.

FIG. 37. The Gapper with the Option/Alt key down, illuminating all space gaps in the middle row.

FIG. 38. The Paragraph Gapper, illuminating a Vertical Gap between two paragraphs.

FIG. 39. Space Marks, showing 4 Minor, 1 Major, 3 Minor, 1 Major, then 2 Minor Space Marks, the last of which marks the end of the Whitespace Gap.

FIG. 40. Space Marks, showing 1 Major, 3 Minor, 1 Major, 3 Minor Space Marks, etc. with a Super Mark atop the first and fifth Major Space Marks.

FIG. 41. The Gapper, showing a View Space Gap another tab, and another 4 spaces.

FIG. 42. The Gapper, showing a View Space Gap containing two No-Break-Space Marks. The Precaret is at the start of the View Whitespace Gap.

FIG. 43. The Gapper, illuminating a gap inside a Selection. The gapper and the Precaret are shown with the same color. (Cursor is absent because arrow keys were used to navigate here.)

FIG. 44. The Preselection, seen only when the shift key is down and the Mouse is moving (middle screen shot in the time series).

FIG. 45. The mouseMoved process

FIG. 46. The mouseDragged process

FIG. 47. The mouseClicked process

FIG. 48. The mouseReleased process

FIG. 49. The mouseEntered process

FIG. 50. The mouseExited process

FIG. 51. The dragOver process

FIG. 52. The focusGained process

FIG. 53. The focusLost process

FIG. 54. The modelInsertionOccurred process

FIG. 55. The modelDeletionOccurred process

FIG. 56. The caretUpdated process

FIG. 57. The shiftKeyReleased process

FIG. 58. The OptionKeyPressed process

FIG. 59. The OptionKeyReleased process

FIG. 60. The mouseStopped process

FIG. 61. The mainTimeoutExpired process

FIG. 62. The showPrecaretInactive process

FIG. 63. The showCaretOrSelection process

FIG. 64. The showPrecaret process
FIG. 65. The showPreselection process
FIG. 66. The updateCursorAppearance process

BEST MODE FOR CARRYING OUT THE INVENTION

Processes of the Invention

Here we will describe important processes of the invention. Any software practitioner skilled in the art of GUI programming will be able to embody these essential processes in a new implementation within a specific GUI software environment. An implementer will fill in implementation details from the descriptions in this document, from their general knowledge of GUI implementation principles, and from their specific knowledge of the GUI software environment in which the invention is to be embodied.

Classes of Objects

The preferred embodiment uses object-oriented practice, which is standard in GUI construction. Object-oriented construction, although not essential to the implementation of the invention, is nevertheless the natural embodiment technique, which allows for the clearest description.

Here is a list of the classes representing the invention's major user-perceivable features:
  Precaret
  Gapper
  Enhanced Cursor
  Enhanced Caret
  Preselection
  PrecaretClicker Two additional classes handle support functions:
  CursorSpeedometer—an object that determines whether the cursor is moving 'fast' or not, where 'fast' is defined as moving so fast that the user cannot follow exactly where the Cursor is and could experience difficulty seeing it. At any time the embodiment can query the CursorSpeedometer as to whether the cursor is moving last', providing the current cursor position as input to the query. After a short time delay (50 ms in the preferred embodiment) during which no speed queries have been made on the CursorSpeedometer, the CursorSpeedometer will assume that mouse motion has stopped and invoke the mouseStopped process to ensure that the embodiment knows that the cursor is no longer moving 'fast'.
  MainTimeoutTimer—a refreshable timer that determines when all Cursor and Caret motion has ceased for a specified period of time (1000 ms in the preferred embodiment). When the timer expires, it invokes the mainTimeoutExpired process.

Initialization and Event Handling

When an embodiment of the invention begins to operate in a text component, it must first create an instance of each class described above.

Completing initialization, the invention ties itself in with the underlying GUI toolkit's event listener mechanisms (using the Adapter pattern) so that these processes of the invention are invoked in the following situations:

| Event-handling process | Situation |
| --- | --- |
| mouseMoved | The mouse moved without the mouse button down. |

-continued

| Event-handling process | Situation |
| --- | --- |
| mouseDragged | The mouse moved with the mouse button down. |
| mouseClicked | The mouse button was clicked. |
| mouseReleased | The mouse button was released. |
| mouseEntered | The mouse entered the text component's View area. |
| mouseExited | The mouse exited the text component's View area. |
| dragOver | The mouse moved during Drag & Drop. |
| focusGained | The text component has gained keyboard focus. |
| focusLost | The text component has lost keyboard focus. |
| modelInsertionOccurred | Characters have been inserted into the Model. |
| modelDeletionOccurred | A range of the Model has been deleted. |
| caretUpdated | The Caret position in the Model has changed either by arrow key or by mouse click (in which case mouseClicked follows); not called in conjunction with modelInsertionOccurred or modelDeletionOccurred. |
| shiftKeyReleased | The shift key was released. |
| OptionKeyPressed | The option key was pressed. |
| OptionKeyReleased | The option key was released. |
| mouseStopped | The CursorSpeedometer has determined that the cursor has probably stopped moving. |
| mainTimeoutExpired | The MainTimeoutTimer expired. |

The above processes in turn invoke the following processes described here:

| Process | Overview |
| --- | --- |
| showPrecaretInactive | Show the Caret or Selection (as appropriate) without Precaret visible. |
| showCaretOrSelection | Show the Caret or Selection (as appropriate and if hasFocus) and show the Precaret if not isDraggingSelection. |
| showPrecaret | Show the Precaret without the Caret visible. |
| showPreselection | Show the Preselection instead of the Selection. |
| updateCursorAppearance | Select normal or dimmed cursor appearance. |

Program Phases

When a GUI program, such as the one described here, handles an event that can effect visual representations of program objects, program operation proceeds in two major phases:
  manipulation of objects that control the visual representations (see flow charts below)
  painting the visual representations of the objects to the display (see specifications above and see the accompanying source code)

Optional Features

The several features of the invention work in concert to solve the user problems recited above.

In the preferred embodiment, all features of the invention are implemented and present. Three features can be enabled/disabled by the user, although they are disabled by default. These three features are:
  Audio feedback when the Precaret moves
  Reversion of the Cursor from the Dimmed Cursor Graphic to the Normal Cursor Graphic when the MainTimeout expires
  Hiding of the Gapper when the MainTimeout expires Although it is not recommended, an embodiment of this invention may differ from the preferred embodiment in one or more of the following ways:

- Some features of the invention are enabled/disabled by default in the alternative embodiment, although in the preferred embodiment they are disabled/enabled by default.
- Some features of the invention cannot be enabled/disabled by the user, although in the preferred embodiment they can be enabled/disabled by the user.
- Some features of the invention are not implemented, although in the preferred embodiment all features are implemented.

Anyone skilled in the arts required to implement an embodiment of the invention will easily be able to determine the necessary changes to the processes of the invention required to allow for runtime enablement/disablement of features or to leave features unimplemented.

Side Effects

In the flowcharts below, sometimes a step will specify the setting of an object's variable (also known as an object's field or slot). For example:

Set the Gapper's is DoingPreselection variable to true.

As is typical of object-oriented programming, setting a variable of an object can invoke additional processes. For example, when setting an object's isVisible variable, further action is taken if necessary to update other internal properties of the object. For details of such situations, see the accompanying source code.

Order of Steps

In the flowcharts below, sometimes a group of steps is shown executing in concurrently, for example, in the mouseMoved process, steps 14, 15, and 16. In such a situation, the preceding step in the accompanying flowchart description says something like, "Go to steps 14, 15, 16." Such charting and description should be taken to mean that the steps in the group can be executed in any order relative to each other, possibly including concurrently.

State Variables

There are a few top-level behavior variables that are set by event methods for use later by subsequent event method invocations and by some methods called from event methods. They are:

```
state - an integer containing one of these values:
    SHOW_PRECARET_INACTIVE
    SHOW_PRECARET
    SHOW_CARET_OR_SELECTION
    SHOW_PRESELECTION
hasFocus
isDraggingSelection
isCursorMovingFast
isMouseExited
```

The mouseMoved Process (FIG. 45)
Start: Go to steps 1, 2, 4, 5.
1. Set Precaret's position to the model position corresponding to the Cursor hotspot and note the hotspot location for use later in the updateCursorAppearance process.
Go to Step 3.
2. Tell the CursorSpeedometer to note the speed of the cursor.
3. Tell PrecaretClicker to click if appropriate.
Go to step 6.
4. Set the Gapper's master to the Precaret.
Go to step 6.
5. Set the isDraggingSelection variable to false.
6. Is the shift key down?
If Yes, go to Steps 8, 9.
7. Invoke the showCaretOrSelection process.
Go to Step 13.
8. Update Preselection to reflect Precaret's position.
Go to Step 10.
9. Set the Gapper's is DoingPreselection variable to true.
10. Is the Preselection empty?
If Yes go to Step 12.
11. Invoke the showPreselection process.
Go to Step 13.
12. Invoke the showPrecaret process.
13. Invoke the updateCursorAppearance process
14. Done.

The mouseDragged Process (FIG. 46)
Start: Go to steps 1, 2, 4, 5.
1. Set Precaret's position to the model position corresponding to the Cursor hotspot and note the hotspot location for use later in the updateCursorAppearance process.
Go to Step 3.
2. Tell the CursorSpeedometer to note the speed of the cursor.
3. Tell PrecaretClicker to click if appropriate.
Go to step 6.
4. Set the Gapper's master to the Precaret.
Go to step 6.
5. Set the isDraggingSelection variable to true.
6. Invoke the showCaretOrSelection process.
7. Invoke the updateCursorAppearance process
8. Done.

The mouseClicked Process (FIG. 47)
Start: Go to step 1.
1. Set the Gapper's is DoingPreselection variable to false.
2. Is the MainTimeout enabled?
If No, go to Step 5.
3. Invoke the showPrecaretInactive process
4. Invoke the updateCursorAppearance process.
Go to Step 6 (Done).
5. Invoke the showCaretOrSelection process.
6. Done.

The mouseReleased Process (FIG. 48)
Start: Go to step 1.
1. Set the isDraggingSelection variable to false.
2. Done.

The mouseEntered Process (FIG. 49)
Start: Go to step 1.
1. Set Precaret's position to the model position corresponding to the Cursor hotspot and note the hotspot location for use later in the updateCursorAppearance process.
Go to Steps 2, 3.
2. Set the isMouseExited variable to false.
Go to Step 4.
3. Set the Gapper's master to the Precaret.
4. Invoke the showCaretOrSelection process.
5. Invoke the updateCursorAppearance process.
6. Done.

The mouseExited Process (FIG. 50)
Start: Go to step 1.
1. Set the isDraggingSelection variable to false.
Go to Step 3.
2. Invoke the showPrecaretInactive process.
3. Go to Steps 4, 5.
4. Set the isMouseExited variable to true.

Go to Step 6 (Done).
5. Invoke the updateCursorAppearance process.
6. Done.
The dragOver Process (FIG. 51)
Start: Go to steps 1, 3.
1. Set Precaret's position to the model position corresponding to the Cursor hotspot and note the hotspot location for use later in the updateCursorAppearance process.
2. Tell PrecaretClicker to click if appropriate.
Go to step 4.
3. Set the Gapper's master to the Precaret.
4. Invoke the showPrecaret process.
5. Invoke the updateCursorAppearance process
6. Done.
The focusGained Process (FIG. 52)
Go to steps 1, 2, 3.
1. Set the hasFocus variable to true.
Go to Step 4.
2. Set the Gapper's hasFocus variable to the true.
Go to Step 4.
3. Set the Gapper's master to the Precaret.
4. Invoke the updateCursorAppearance process.
5. Done.
The focusLost Process (FIG. 53)
Start: Go to step 1.
1. Set the hasFocus variable to false.
Go to Step 3 (Done).
2. Set the Gapper's hasFocus variable to the false.
3. Done.
The modelInsertionOccurred Process (FIG. 54)
Start: Go to steps 1, 2, 3, 4, 5.
1. Update the PrecaretClicker's modelPosition to the same value as the Precaret's modelPosition.
Go to Step 6.
2. Recalculate the Precaret's position to match the Cursor's hotspot as it was the last time the Precaret's position was set to the model position corresponding to the Cursor hotspot.
Go to Step 6.
3. Set the Caret's position to the insertion point of the model.
Go to Step 6.
4. Set the Gapper's master to the Caret.
Go to Step 6.
5. Set the Gapper's minimumGap variable to 2. (Normally, setting the Gapper's master sets minimumGap to 1. If the length of the nearest Whitespace Gap is less than minimumGap, the Gapper is not displayed.)
6. Invoke the showCaretOrSelection process.
7. Invoke the updateCursorAppearance process.
8. Done.
The modelDeletionOccurred Process (FIG. 55)
Start: Go to steps 1, 2, 3, 4, 5.
1. Update the PrecaretClicker's modelPosition to the same value as the Precaret's modelPosition.
Go to Step 6.
2. Recalculate the Precaret's position to match the Cursor's hotspot as it was the last time the Precaret's position was set to the model position corresponding to the Cursor hotspot.
Go to Step 6.
3. Set the Caret's position to the insertion point of the model.
Go to Step 6.
4. Set the Gapper's master to the Caret.
Go to Step 6.
5. Set the Gapper's forceUpdate variable to true.
6. Invoke the showCaretOrSelection process.
7. Invoke the updateCursorAppearance process.
8. Done.

The caretUpdated Process (FIG. 56)
Start: Go to steps 1, 2, 3.
1. Recalculate the Precaret's position to match the Cursor's hotspot as it was the last time the Precaret's position was set to the model position corresponding to the Cursor hotspot.
Go to Step 4.
2. Set the Caret's position to the insertion point of the model.
Go to Step 4.
3. Set the Gapper's master to the Caret.
4. Invoke the showCaretOrSelection process.
5. Invoke the updateCursorAppearance process.
6. Done.
The shiftKeyReleased Process (FIG. 57)
Start: Go to step 1.
1. Set the Gapper's is DoingPreselection variable to false.
2. Invoke the showCaretOrSelection process.
3. Invoke the updateCursorAppearance process
4. Done.
The optionKeyPressed Process (FIG. 58)
Start: Go to step 1.
1. Set the Gapper's is EntireRow variable to true.
2. Done.
The optionKeyReleased Process (FIG. 59)
Start: Go to step 1.
1. Set the Gapper's is EntireRow variable to false.
2. Done.
The mouseStopped Process (FIG. 60)
Start: Go to step 1.
1. Invoke the updateCursorAppearance process.
2. Done.
The mainTimeoutExpired Process (FIG. 61)
Start: Go to step 1.
1. Is the state variable set to SHOW_PRESELECTION?
If Yes, Go to Step 6 (Done).
2. Is the optional feature to hide the Precaret and Gapper on MainTimeout expiration enabled?
If No, go to Step 4.
3. Invoke the showPrecaretInactive process
4. Is the optional feature to revert to the Normal Cursor Graphic on MainTimeout expiration enabled?
If No, Go to Step 6 (Done).
5. Tell the cursor to use the Normal Cursor Graphic.
6. Done.
The showPrecaretInactive Process (FIG. 62)
Start: Go to steps 1, 8, 9, 10, 11, 12.
1. Is the hasFocus variable set to true?
If Yes, go to Steps 4, 5.
If No, go to Steps 2, 3.
2. Set the Caret's visibility to false.
Go to Step 13 (Done).
3. Set the Selection's visibility to false.
Go to Step 13 (Done).
4. Set the Selection's visibility to true.
Go to Step 13 (Done).
5. Is the Selection active (Selection length≠0)?
If No, go to Step 7.
6. Set the Caret's visibility to false.
Go to Step 13 (Done).
7. Set the Caret's visibility to true.
Go to Step 13 (Done).
8. Set the Precaret's visibility to false.
Go to Step 13 (Done).
9. Set the Preselection's visibility to false.
Go to Step 13 (Done).
10. Set the Gapper's visibility to the value of its is EntireEntireRow variable.

Go to Step 13 (Done).
11. Reset the PrecaretClicker so that it will be sure to click the next time it is given a modelPosition.
Go to Step 13 (Done).
12. Set the state variable to SHOW_PRECARET_INACTIVE.
13. Done.

The showCaretOrSelection Process (FIG. 63)
Start: Go to steps 1, 9, 12, 13, 14, 15.
1. Is the hasFocus variable true?
If Yes, go to Step 4.
If No, go to Steps 2, 3.
2. Set the Caret's visibility to false.
Go to Step 16 (Done).
3. Set the Selection's visibility to false.
Go to Step 16 (Done).
4. Is the isDraggingSelection variable true or is the Selection active (Selection length≠0)?
If Yes, go to Steps 5, 6.
If No, go to Steps 7, 8.
5. Set the Caret's visibility to false.
Go to Step 16 (Done).
6. Set the Selection's visibility to true.
Go to Step 16 (Done).
7. Set the Caret's visibility to true.
Go to Step 16 (Done).
8. Set the Selection's visibility to false.
Go to Step 16 (Done).
9. Is the isDraggingSelection variable true or is the isMouseExited variable is true?
If No, go to Step 11.
10. Set the Precaret's visibility to false.
Go to Step 16 (Done).
11. Set the Precaret's visibility to true.
Go to Step 16 (Done).
12. Set the Preselection's visibility to false.
Go to Step 16 (Done).
13. Set the Gapper's visibility to true.
Go to Step 16 (Done).
14. Refresh the MainTimeout, so the delay until expiration is again the maximum.
Go to Step 16 (Done).
15. Set the state variable to SHOW_CARET_OR_SELECTION.
16. Done.

The showPrecaret Process (FIG. 64)
Start: Go to steps 1, 2, 3, 4, 5, 6, 7.
1. Set the Caret's visibility to false.
Go to Step 8 (Done).
2. Set the Selection's visibility to false.
Go to Step 8 (Done).
3. Set the Precaret's visibility to true.
Go to Step 8 (Done).
4. Set the Preselection's visibility to false.
Go to Step 8 (Done).
5. Set the Gapper's visibility to true.
Go to Step 8 (Done).
6. Refresh the MainTimeout, so the delay until expiration is again the maximum.
Go to Step 8 (Done).
7. Set the state variable to SHOW_PRECARET.
8. Done.

The showPreselection Process (FIG. 65)
Start: Go to steps 1, 2, 3, 4, 5, 6, 7.
1. Set the Caret's visibility to false.
Go to Step 8 (Done).
2. Set the Selection's visibility to false.
Go to Step 8 (Done).
3. Set the Precaret's visibility to false.
Go to Step 8 (Done).
4. Set the Preselection's visibility to true.
Go to Step 8 (Done).
5. Set the Gapper's visibility to true.
Go to Step 8 (Done).
6. Refresh the MainTimeout, so the delay until expiration is again the maximum.
Go to Step 8 (Done).
7. Set the state variable to SHOW_PRESELECTION.
8. Done.

The updateCursorAppearance Process (FIG. 66)
Start: Go to step 1.
1. Is the isCursorMovingFast variable set to true?
If Yes, go to Step 5.
2. Is the value of the state variable equal to SHOW_PRECARET_INACTIVE.
If Yes, go to Step 5.
3. Is the Precaret's position outside the text, i.e. to the right of the end of a row, in a gap between paragraphs, or beyond the last line of the model?
If Yes, go to Step 5.
4. Tell the Cursor to use the Dimmed Cursor Graphic.
Go to Step 6 (Done).
5. Tell the Cursor to use the Normal Cursor Graphic.
6. Done.

INDUSTRIAL APPLICABILITY

The invention can be implemented in a computer operating system, in a GUI software library, or in a software application program. It can be implemented with or without special graphics hardware assistance.

The invention claimed is:
1. A method for continually updating, in a document display graphical user interface, the location of a Precaret for providing feedback for the movements of a user input on a display, the method comprising:
    displaying an insertion caret at a first character edge location of a document on the document display;
    receiving user input to move a cursor about the document, wherein the user input is not associated with a drag or drop operation;
    continuously determining new pixel locations corresponding to updated movements of the user input;
    continuously determining character edge locations proximate to the new pixel locations;
    displaying a Precaret in each new character edge location corresponding to the updated movements, wherein the Precaret location is continuously updated to reflect the movements of the cursor about the document;
    receiving user input selection at the Precaret location;
    removing the insertion caret from the first character edge location;
    displaying the insertion caret in the Precaret location thereby replacing the Precaret;
    and wherein displaying the Precaret comprises:
    graphically snapping the Precaret between character edge locations by displaying the Precaret only at the character edge locations and omitting display of the Precaret at pixel locations that do not correspond to character edge locations so that the Precaret appears to jump between character edge locations.
2. The method of claim 1, wherein the cursor is visually dimmed.

3. The method of claim 1, further comprising:
determining if the character edge location is within a contiguous range of one or more spacing characters containing or adjacent to the character edge location;
displaying one or more highlight indicia for the spacing characters; and
visually indicating the location of the Precaret relative to the spacing characters.

4. The method of claim 1, further comprising:
determining if the character edge location coincides with a beginning of a paragraph or an end of a paragraph;
determining a vertical spacing attached to a bottom of the paragraph above the character edge location and a vertical spacing attached to a top of the paragraph below the character; and
displaying indicia visually indicating an amount of additional vertical spacing attached above or below the paragraphs.

5. The method of claim 1, further comprising:
determining if the character edge location coincides with a left or right end of a row of text;
determining one or more margin spacing or indent spacing properties relating to the character edge location;
displaying one or more indicia for the spacing properties.

6. The method of claim 1, further comprising:
receiving an additional user input to activate a prospective selection mode;
displaying one or more indicia of the prospective selection; and
continuously updating the indicia according to selection of one or more new character edge locations.

7. The method of claim 1, further comprising:
determining one or more characteristics of the character edge location, the one or more characteristics comprising: (1) at beginning of text, (2) at end of text, (3) at beginning of paragraph, (4) at end of paragraph, (5) at beginning of wrapped line, (6) at end of wrapped line, or (7) soft return;
displaying alternate Precaret indicia distinguishing the character edge location according to the determined characteristics.

8. The method of claim 3, further comprising:
determining that the indicia have been displayed for an amount of time;
removing the indicia after the amount of time.

9. The method of claim 4, further comprising:
determining that the indicia have been displayed for an amount of time; removing
the indicia after the amount of time.

10. The method of claim 5, further comprising:
determining that the indicia have been displayed for an amount of time; removing
the indicia after the amount of time.

* * * * *